(12) United States Patent
Zhao et al.

(10) Patent No.: US 6,501,875 B2
(45) Date of Patent: Dec. 31, 2002

(54) MACH-ZEHNDER INTEFEROMETERS AND APPLICATIONS BASED ON EVANESCENT COUPLING THROUGH SIDE-POLISHED FIBER COUPLING PORTS

(75) Inventors: Shulai Zhao, Encinitas, CA (US); Bo Pi, Carlsbad, CA (US)

(73) Assignee: Oluma, Inc., Carlsbad, CA (US)

( * ) Notice: Subject to any disclaimer, the term of this patent is extended or adjusted under 35 U.S.C. 154(b) by 0 days.

(21) Appl. No.: 09/884,883

(22) Filed: Jun. 18, 2001

(65) Prior Publication Data

US 2002/0048429 A1 Apr. 25, 2002

Related U.S. Application Data

(63) Continuation-in-part of application No. 09/796,373, filed on Feb. 27, 2001
(60) Provisional application No. 60/280,617, filed on Mar. 30, 2001, provisional application No. 60/214,686, filed on Jun. 27, 2000, provisional application No. 60/214,589, filed on Jun. 27, 2000, and provisional application No. 60/214,694, filed on Jun. 27, 2000.

(51) Int. Cl.[7] .................................................. G02B 6/26
(52) U.S. Cl. ............................. 385/30; 385/15; 385/31; 385/32; 385/50
(58) Field of Search ............................ 385/15, 18, 30, 385/31, 32, 39, 50, 65, 83

(56) References Cited

U.S. PATENT DOCUMENTS

| | | | |
|---|---|---|---|
| 4,021,097 A | 5/1977 | McMahon |
| 4,136,929 A | 1/1979 | Suzaki |
| 4,259,016 A | 3/1981 | Schiffner |
| 4,301,543 A | 11/1981 | Palmer |
| 4,302,071 A | 11/1981 | Winzer |

(List continued on next page.)

FOREIGN PATENT DOCUMENTS

| | | |
|---|---|---|
| DE | 28 12 346 A1 | 3/1978 |
| EP | 0178045 A1 | 4/1986 |
| FR | 2613844 A1 | 10/1988 |
| JP | 52-14430 A2 | 2/1977 |
| JP | 52-24539 | 2/1977 |
| JP | 53-91752 A2 | 8/1978 |
| JP | 54-4153 A2 | 1/1979 |
| JP | 54-8542 | 1/1979 |
| JP | 54-68651 | 1/1979 |
| JP | 54-101334 A2 | 8/1979 |
| JP | 54-118255 A2 | 9/1979 |
| JP | 56-85702 | 7/1981 |
| JP | 58-10701 | 1/1983 |
| JP | 60-131503 | 7/1985 |
| JP | 64-50003 | 2/1989 |
| JP | 1-130106 | 5/1989 |
| JP | 1-222205 | 9/1989 |
| JP | 1-255803 | 10/1989 |
| JP | 4-31801 | 2/1992 |
| WO | WO 87/03676 | 6/1987 |

OTHER PUBLICATIONS

McCallion et al., "Side–polished fiber provides functionality and transparency," (Abstract) Laser Focus World, vol. 34, No. 9, p. S19–20, S22, S24, PennWell Publishing, Sep., 1998.

Das et al., "Automatic determination of the remaining cladding thickness of a single–mode fiber half–coupler," (Abstract) Optics Letters, vol. 19, No. 6, p. 384–6, Mar. 15, 1994.

(List continued on next page.)

*Primary Examiner*—Akm E. Ullah
*Assistant Examiner*—Jennifer Doan
(74) *Attorney, Agent, or Firm*—Fish & Richardson P.C.

(57) ABSTRACT

Optical Mach-Zehnder interferometers and related devices, systems that have at least one fiber integrated or engaged to a substrate fabricated with one or more grooves.

42 Claims, 23 Drawing Sheets

U.S. PATENT DOCUMENTS

| | | | |
|---|---|---|---|
| 4,307,933 A | | 12/1981 | Palmer et al. |
| 4,315,666 A | | 2/1982 | Hicks, Jr. |
| 4,378,539 A | | 3/1983 | Swanson |
| 4,392,712 A | | 7/1983 | Ozeki |
| 4,431,260 A | | 2/1984 | Palmer |
| 4,479,701 A | * | 10/1984 | Newton et al. ......... 350/96.16 |
| 4,493,528 A | | 1/1985 | Shaw et al. |
| 4,536,058 A | | 8/1985 | Shaw et al. |
| 4,556,279 A | | 12/1985 | Shaw et al. |
| 4,560,234 A | * | 12/1985 | Shaw et al. ............. 350/96.15 |
| 4,564,262 A | | 1/1986 | Shaw |
| 4,601,541 A | | 7/1986 | Shaw et al. |
| 4,688,882 A | | 8/1987 | Failes |
| 4,721,352 A | * | 1/1988 | Sorin et al. ............. 350/96.15 |
| 4,723,827 A | * | 2/1988 | Shaw et al. ............. 350/96.15 |
| 4,778,237 A | * | 10/1988 | Sorin et al. ............. 350/96.15 |
| 4,784,453 A | * | 11/1988 | Shaw et al. ............. 350/96.16 |
| 4,828,350 A | | 5/1989 | Kim et al. |
| 4,842,358 A | * | 6/1989 | Hall ....................... 350/96.15 |
| 4,869,567 A | | 9/1989 | Millar et al. |
| 4,896,932 A | | 1/1990 | Cassidy |
| 4,900,118 A | | 2/1990 | Yanagawa et al. |
| 4,986,624 A | | 1/1991 | Sorin et al. |
| 4,991,922 A | | 2/1991 | Dahlgren |
| 5,029,961 A | | 7/1991 | Suzuki et al. |
| 5,042,896 A | | 8/1991 | Dahlgren |
| 5,100,219 A | | 3/1992 | Takahashi |
| 5,329,607 A | | 7/1994 | Kamikawa et al. |
| 5,444,723 A | | 8/1995 | Chandonnet et al. |
| 5,533,155 A | | 7/1996 | Barberio et al. |
| 5,586,205 A | | 12/1996 | Chen et al. |
| 5,623,567 A | | 4/1997 | Barberio et al. |
| 5,651,085 A | | 7/1997 | Chia |
| 5,729,641 A | | 3/1998 | Chandonnet et al. |
| 5,781,675 A | | 7/1998 | Tseng et al. |
| 5,809,188 A | | 9/1998 | Tseng et al. |
| 5,841,926 A | | 11/1998 | Takeuchi et al. |
| 5,854,864 A | | 12/1998 | Knoesen et al. |
| 5,892,857 A | | 4/1999 | McCallion |
| 5,900,983 A | | 5/1999 | Ford et al. |
| 5,903,685 A | | 5/1999 | Jones et al. |
| 5,915,063 A | | 6/1999 | Colbourne et al. |
| 5,940,556 A | | 8/1999 | Moslehi et al. |
| 5,963,291 A | | 10/1999 | Wu et al. |
| 5,966,493 A | | 10/1999 | Wagoner et al. |
| 5,970,201 A | | 10/1999 | Anthony et al. |
| 6,011,881 A | | 1/2000 | Moslehi et al. |
| 6,026,205 A | | 2/2000 | McCallion et al. |
| 6,038,359 A | | 3/2000 | Moslehi et al. |
| 6,052,220 A | | 4/2000 | Lawrence et al. |
| 6,058,226 A | | 5/2000 | Starodubov |
| 6,130,984 A | | 10/2000 | Shen et al. |
| 6,134,360 A | | 10/2000 | Cheng et al. |
| 6,144,793 A | | 11/2000 | Matsumoto et al. |
| 6,185,358 B1 | | 2/2001 | Park |

OTHER PUBLICATIONS

Ishikawa et al., "A new optical attenuator using the thermal diffusion of W–cladding fiber," (Abstract) MOC/GRIN '97 Technical Digest of the 6th Microoptics Conf./14th Topical Meeting on Gradient–Index Optical Systems in Tokyo, Japan, p. (vii+432+27), 208–11, Oct. 1997.

Matejec et al., "Optical fiber with novel geometry for evanescent–wave sensing," (Abstract) Sensors and Actuators B, (Chemical), vol. B29, No. 1–3, p. 416–22, Elsevier Publishing, Oct. 1995.

Alonso et al., "Single–mode, optical–fiber sensors and tunable wavelength filters based on the resonant excitation of metal–clad modes," (Abstract) Applied Optics, vol. 33, No. 22, p. 5197–201, Aug. 1, 1994.

Tomita et al., "Leaky–mode loss of the second propagating mode in single–mode fibres with index well profiles," (Abstract) Applied Optics, vol. 24, No. 11, p. 1704–7, Jun. 1, 1995.

Leminger et al., "Determination of the variable core–to–surface spacing of single–mode fiber–coupler blocks," (Abstract) Optics Letters, vol. 12, No. 3, p. 211–13, Mar., 1987.

Morshnev et al., "A fiber thermo–optical attenuator," (Abstract) Source: Radiotekhnika i Elektronika, Translated in: Soviet Journal of Communications Technology & Electronics, vol. 30, No. 9, p. 148–50, Sep., 1985.

Takahashi Mitsuo, "Variable light atttenuator of improved air–gap type with extremely low returning light," (Abstract) Conf. Record—IEEE Instrumentation and Measurement Tech. Conf. 2, p. 947–950, 1994.

Schmidt et al., "New design approach for a programmable optical attenuator," (Abstract) Hewlett–Packard Journal, v. 46, n. 1, p. 34–39, 1995.

Hayata et al., "Algebraically decaying modes of dielectric planar waveguides," Optics Letters, vol. 20, No. 10, p. 1131–32, May 15, 1995.

Vengsarkar et al., "Photoinduced refractive–index changes in two–mode, elliptical–core fibers: sensing applications," Optics Letters, vol. 16, No. 19, p. 1541–43, Oct. 1, 1991.

Pantchev et al., "Method of Refractive Index Profile Reconstruction from Effective Index of Planar Optical Monomode Waveguides: Application to Potassium Ion–Exchanged Waveguides," IEEE Journal of Quantum Electronics, vol. 29, No. 1, p. 154–60, Jan. 1993.

Ikeda et al., "Analysis of the Attenuation Ratio of MQW Optical Intensity Modulator for 1.55 $\mu$m Wavelength Taking Account of Electron Wave Function Leakage," IEEE Journal of Quantum Electronics, vol. 32, No. 2, p. 284–92, Feb. 1996.

S. Masuda, "Variable attenuator for use in single–mode fiber transmission systems," Applied Optics, vol. 19, No. 14, p. 2435–38, Jul. 15, 1980.

Huang et al., "Field–Induced Waveguides and Their Application to Modulators," IEEE Journal of Quantum Electronics, vol. 29, No. 4, p. 1131–1143, Apr. 1993.

Iztkovich et al., "In–Situ Investigation of Coupling Between a Fibre and a Slab Waveguide," Tel Aviv University, Israel, May 29, 1990.

Brierley et al., "Amplitude and phase characterization of polished directional half–couplers with variable refractive index overlays," Optical Engineering, vol. 27, No. 1, p. 045–49, Jan. 1988.

Scholl et al., "In–line fiber optical attenuator and powermeter," SPIE vol. 1792 Components for Fiber Optic Applications VII, p. 65–70, 1992.

Tsujimoto et al., "Fabrication of Low–Loss 3 dB Couplers With Multimode Optical Fibers," Electronics Letters, vol. 14, No. 5, Mar. 2, 1978.

* cited by examiner

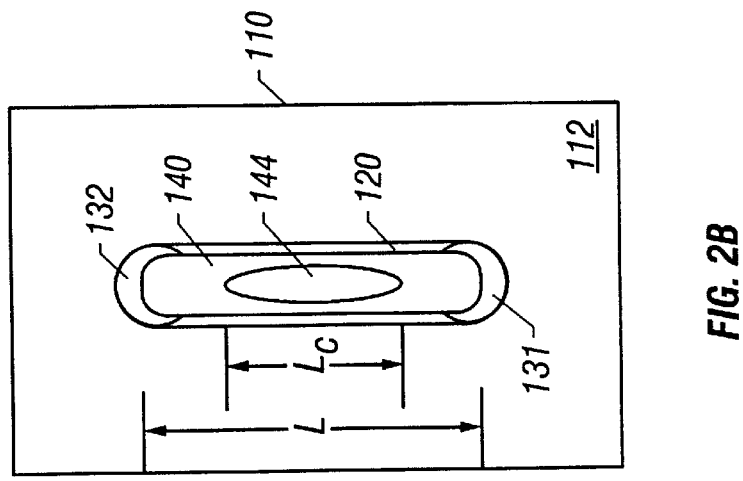
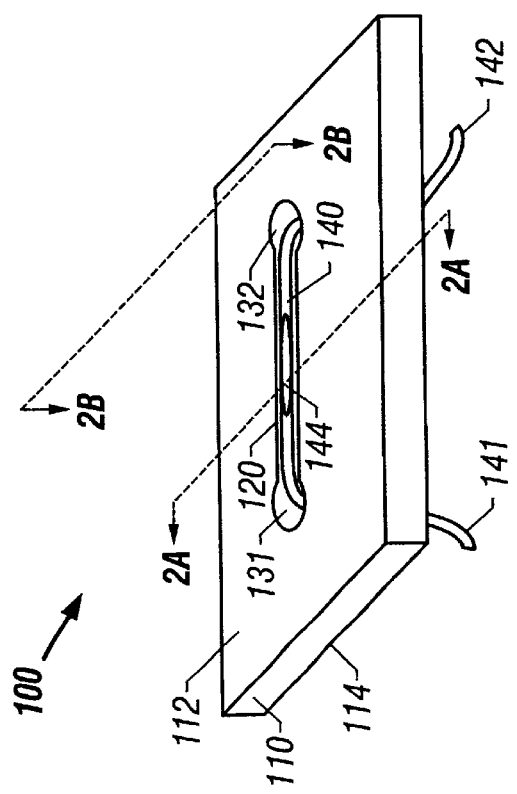
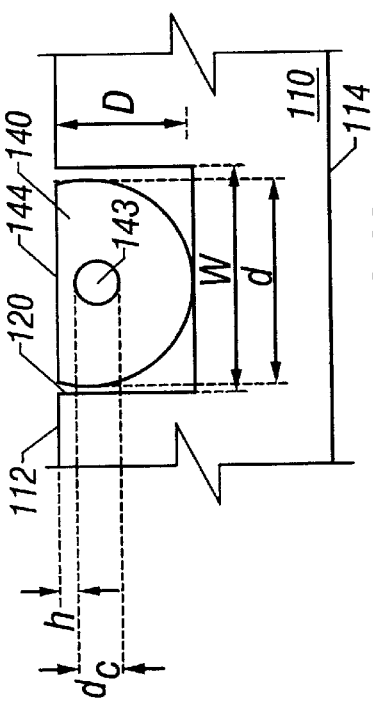
FIG. 2B
FIG. 1
FIG. 2A

MACH-ZEHNDER INTEFEROMETERS AND APPLICATIONS BASED ON EVANESCENT COUPLING THROUGH SIDE-POLISHED FIBER COUPLING PORTS

This application is a continuation-in-part of U.S. application Ser. No. 09/796,373 entitled "INTEGRATION OF FIBERS ON SUBSTRATES FABRICATED WITH GROOVES" filed Feb. 27, 2001. This application also claims the benefit of U.S. Provisional Application No. 60/280,617 entitled "TRANSVERSE OPTICAL COUPLING BETWEEN A FIBER AND A WAVEGUIDE" and filed Mar. 30, 2001. Furthermore, this application claims the benefit of U.S. Provisional Application Nos. 60/214,686 entitled "WAFER SCALE FIBER OPTIC DEVICE FABRICATION TECHNIQUE FOR MASS PRODUCTION," 60/214,589 entitled "AN INTEGRATABLE FIBER OPTIC COUPLING TECHNIQUE," and 60/214,694 entitled "FIBER BASED FREQUENCY DIVISION MULTIPLEXER", all of which were filed on Jun. 27, 2000.

BACKGROUND

This application relates to optical signal multiplexers, and in particular, to optical signal multiplexers based on evanescent coupling through a polished fiber coupling port.

Optical waves may be transported through optical waveguiding elements or "light pipes" such as optical fibers, or optical waveguides formed on substrates. A typical fiber may be simplified as a fiber core and a cladding layer surrounding the fiber core. The refractive index of the fiber core is higher than that of the fiber cladding to confine the light. Light rays that are coupled into the fiber core within a maximum angle with respect to the axis of the fiber core are totally reflected at the interface of the fiber core and the cladding. This total internal reflection provides a mechanism for spatially confining the optical energy of the light rays in one or more selected fiber modes to guide the optical energy along the fiber core. Optical waveguides formed on substrates can also be designed to provide spatial optical confinement based on total the internal reflection. Planar waveguides, for example, may be formed by surrounding a slab or strip of a dielectric material with one or more dielectric materials with refractive indices less than that of the dielectric slab or strip.

Optical fibers may be used in transmission and delivery of optical signals from one location to another in a variety of optical systems, including but not limited to, fiber devices, fiber links and fiber networks for data communications and telecommunications. Optical waveguides on substrates may be used in integrated optical devices where optical elements, opto-electronic elements, or MEMS elements are integrated on one or more substrates.

The guided optical energy in the fiber or waveguide, however, is not completely confined within the core of the fiber or waveguide. In a fiber, for example, a portion of the optical energy can "leak" through the interface between the fiber core and the cladding via an evanescent field that essentially decays exponentially with the distance from the core-cladding interface. The distance for a decay in the electric field of the guided light by a factor of e≈2.718 is about one wavelength of the guided optical energy. This evanescent leakage may be used to couple optical energy into or out of the fiber core, or alternatively, to perturb the guided optical energy in the fiber core.

SUMMARY

This application includes optical signal multiplexers that have at least one fiber integrated on or engaged to a substrate fabricated with one or more grooves. One portion of the cladding of this fiber is removed and polished to form a fiber coupling port through which optical energy can be evanescently coupled into or out of the fiber core via evanescent fields. At least two such fiber coupling ports may be formed at different positions in the fiber such that this fiber can be coupled with two coupling ports of another fiber or planar waveguide to form a Mach-Zehnder interferometer for signal multiplexing or demultiplexing in an integrated device configuration.

The fiber may be mounted and engaged to one or more grooves formed in a substrate in a fiber device. One embodiment of the fiber device includes a substrate that is formed with an elongated groove on one substrate surface, and at least one opening located at one end of the groove and formed through the substrate to extend between the two sides of the substrate. An optical fiber is engaged to the substrate by passing through the opening to lay a portion in the groove. The fiber cladding of the portion in the groove may be partially removed to form a fiber coupling port to allow for evanescent coupling.

The optical coupling between a fiber in a first substrate in one of the above fiber devices and a waveguide formed in a second substrate may be implemented by positioning the first and the second substrates relative to each other so that a coupling port of the fiber is adjacent to the waveguide to allow for evanescent coupling between the fiber and the waveguide. A single fiber may be optically coupled to two or more waveguides through its different coupling ports located in grooves of the first substrate.

BRIEF DESCRIPTION OF THE DRAWINGS

FIG. 1 shows one embodiment of a fiber device that integrates or engages a fiber to a substrate with a groove for positioning the fiber and openings for holding the fiber.

FIGS. 2A and 2B show a cross sectional view of the device in FIG. 1 along the direction AA' and a side view of the device in FIG. 1 along the direction BB', respectively.

Like reference symbols in the various drawings indicate like elements.

DETAILED DESCRIPTION

Figure 3B:
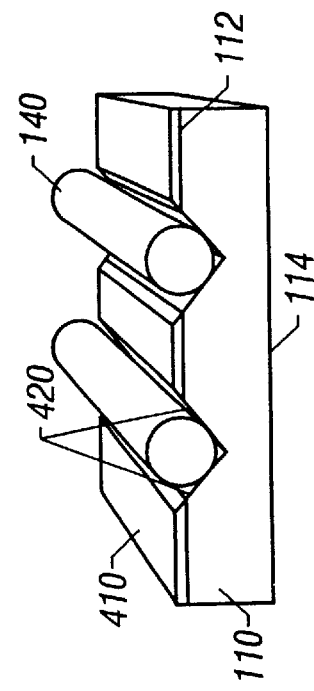
FIGS. 3A and 3B show examples of two different cross sections for grooves shown in FIG. 1.

A Mach-Zehnder interferometer may be generally formed by having two separate optical paths joined to each other at two separate joints. Each optical path may be a fiber or planar waveguide. One joint may be used as an input port at which an input optical signal originally in either one optical path is received and split into two equal optical signals separately in the two optical paths. Accordingly, the other joint at the opposite sides of the optical paths may be used as the output port at which the two optical signals, after propagating through the two separate optical paths, are combined to interfere with each other. This device is a 4-terminal device with two inputs and two outputs.

In such a Mach-Zehnder interferometer, each of the input and output joints can be formed by overlapping the two optical paths over a region with a desired coupling length to allow for energy coupling therebetween so that it is essentially a 3-dB directional coupler and the coupling length in the overlapped region is selected to produce a relative phase shift of $\pi/2$ for optical signals at wavelengths that are to be equally divided in the two optical paths. Hence, the total phase shift at each output optical path after the output port is a sum of the phase shift at the input joint port, the phase shift between the two optical paths between the input and output joint ports, and the phase shift at the output joint port. The phase shift between the two optical paths is determined by the optical path lengths, i.e., the refractive index multiplied by the physical length, of the two optical paths. Depending on whether the phase difference between the two optical paths between the input and output ports is $2N\pi$ or $2(N+1)\pi$, where N=0, ±1, ±2, etc., the interference can make an input signal from one optical path to either stay in the same optical path at the output or switch to the other optical path at the output.

In WDM applications wherein different WDM channels are evenly spaced in the frequency domain, the difference in the total phase shifts between two adjacent WDM channels in such a Mach-Zehnder interferometer may be $\pi$ so that the total phase shifts for the odd-numbered WDM channels are $2N\pi$ while the total phase shifts for the even-numbered WDM channels are $2(N+1)\pi$ (N=0, ±1, ±2, etc.), or vice versa. Hence, the Mach-Zehnder interferometer may select all even-numbered WDM channels to output at one output optical path and all odd-numbered WDM channels to output at the other output optical path.

The devices and techniques of this application use at least one fiber integrated on or engaged to a substrate fabricated with one or more grooves to form one of the optical paths in the above Mach-Zehnder interferometer. One portion of the cladding of this fiber is removed and polished to form a fiber coupling port with a surface that is sufficiently close to the fiber core so that optical energy can be coupled via evanescent fields out of or into the fiber core. At least two such fiber coupling ports may be formed at different positions in the fiber such that this fiber can be coupled with two coupling ports of another fiber or planar waveguide to form the input and output joint ports for the Mach-Zehnder interferometer. As described below, the fiber may be integrated on or engaged to a substrate by engaging to one or more elongated grooves and may be fabricated to remove a portion of the fiber cladding to form an optically polished surface as the fiber coupling port. The waveguide may also be processed to form a coupling port by, e.g., photolithographic based etching process.

The following sections will describe in detail the basic structures of a fiber module or half fiber coupler device in which a fiber is integrated or engaged to a substrate with at least two fiber coupling ports. Next, embodiments of Mach-Zehnder interferometers based on such half fiber couplers are described.

FIG. 1 shows one embodiment of a fiber device 100 where a fiber 140 is integrated or engaged to a substrate 110. The fiber device 100 may be used as a building block to construct a variety of fiber devices, including but not limited to, fiber couplers, fiber attenuators, fiber modulators, fiber beam splitters, optical fiber switches, and fiber frequency-division multiplexers. FIGS. 2A and 2B show additional details of the fiber device 100.

The substrate 110 may be formed of various materials, such as semiconductors, insulators including dielectric materials (e.g., a glass, a quartz, a crystal, etc), metallic materials, or any other solid-state materials that can be processed to form the device features such as grooves and through holes disclosed herein. Two parallel and opposing substrate surfaces, 112 and 114, are generally flat and may be polished. An elongated groove 120 is formed in the substrate 110 on the surface 112 and is essentially a recess from the surface 112. The groove 120 may be fabricated by removing a portion of the material from the substrate 110 through etching or other processes.

The geometry of the groove 120 is generally elongated along a straight line as illustrated or along a curved line. Unless otherwise indicated, the following description will use straight-line grooves as examples. Some embodiments are described with specific reference to groove with V-shaped cross sections as shown by the groove 310 in FIG. 3B. The cross sections are generally not so limited and may also be other shapes as well, including rectangular as shown in FIG. 2A, U-shaped as shown by the groove 310 in FIG. 3A, a circularly shape or other suitable shapes.

The width, W, of the groove 120 is generally greater than the diameter, d, of the fiber 140 and may either remain a constant or vary spatially along the groove 120, e.g., increasing from the center towards the two ends. The length, L, of the groove 120 may vary from one grove to another and can be determined based on specific requirements of applications. The depth D of the groove 120 may be a constant or may vary along the groove 120, e.g., increasing from the center towards the two ends. In general, at least a portion of the groove 120 has a depth D to expose a portion of the fiber cladding of the fiber 140 above the surface 112 while still keeping the fiber core below the surface 112. Sometimes, the depth D of the groove 120 may also be selected to expose the fiber core. Other portions of the groove 120 may have a different depth so that the fiber can be placed within the groove 120 under the substrate surface 112. Depending on the geometry of the groove 120 (e.g., the apex angle of a V-shaped groove), the depth D of the entire groove 120 may be greater than fiber diameter d. For a groove with a rectangular cross section as shown in FIG. 2A, at least a portion of the groove 120 has a depth D less than the fiber diameter d but greater than the sum of the fiber radius $r=d/2$ and radius of the fiber core $r_c=d_c/2$. This portion of the groove 120 exposes partial fiber cladding of the fiber 140 above the surface 112 while still keeping the fiber core below the surface 112. Other portions of the groove 120 may have a depth that is at least the fiber diameter d so that the fiber can be essentially placed in the groove 120 below the surface 112. However, in certain applications such as the device shown in FIG. 12, the depth D of the entire groove 120 may be greater than fiber diameter d. Unless otherwise indicated, the following description will assume that at least a portion of a groove 120 to expose a portion of the fiber cladding above the surface 112 and adjacent portions sufficiently deep to keep the fiber below the surface 112. In case of the rectangular groove 120, the central portion of the groove 120 may have a depth D less than d but greater than $(d+d_c)/2$ while the portions on either sides of the central portion may have a depth equal to or greater than the fiber diameter d.

Notably, the fiber device 100 includes two openings 131 and 132 that are respectively formed at the two ends of the groove 120 and penetrate through the substrate 110. Hence, the openings 131 and 132 are through holes extending between the two surfaces 112 and provide access from one surface (112 or 114) to another. The spacing between the openings 131 and 132 essentially determines the length L of the groove 120. The aperture of the openings 131 and 132 should be sufficiently large to receive the fiber 140, e.g., with a diameter greater than the diameter of the fiber 140. The shape of the holes 131 and 132 may generally be in any suitable geometry.

A portion of the fiber 140 is placed in the groove 120 near the surface 112. The remaining portions 141, 142 of the fiber 140 on both sides of the portion in the groove 120 are respectively fed through the first and second openings 131, 132 to the other side 114 of the substrate 110. After being placed in the substrate 110 as shown in FIG. 1, the fiber 140 may be slightly pulled by moving the fiber portions 141 and 142 in opposite directions so that the portion of the fiber 140 in the groove 120 is in substantially full contact with the groove 120.

Since a portion of the groove 120 has a depth D less than the fiber diameter d, the cladding of the fiber 140 in this portion protrudes out of the surface 112. The fiber core in this portion of the fiber is generally kept under the surface 112. For example, the cladding of a central portion of the fiber 140 between the holes 131 and 132 may be exposed. This protruded or exposed cladding is then removed and polished to form a flat surface 144 of a length $L_c$ that is above the fiber core 143 and is substantially coplanar with the surface 112 of the substrate 110. When the spacing, h, between the flat surface 144 and the fiber core 142 is sufficiently small (e.g., on the order of or less than one wavelength of optical energy), the flat surface 144 can be used to couple optical energy into or out of the fiber core 144 through the evanescent fields outside the fiber core. Hence, the length, Lc, of the flat surface 144 approximately represents the optical coupling length for the fiber device 100.

Figure 4B:
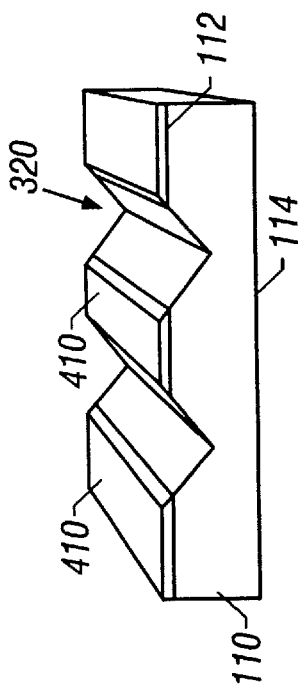
FIGS. 4A, 4B, 5A, 5B, 5C, 5D, and 5E illustrate a process of fabricating V grooves in semiconductor substrates by anistropic etching.
Figure 3A:
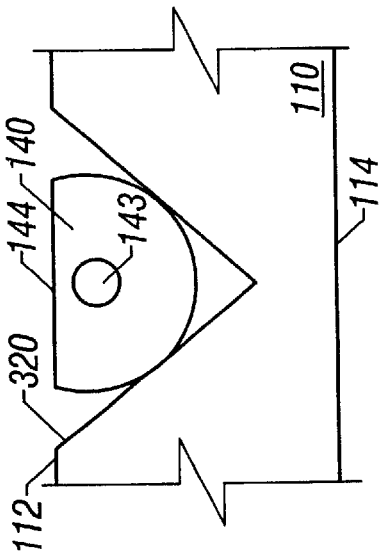
Figure 4A:
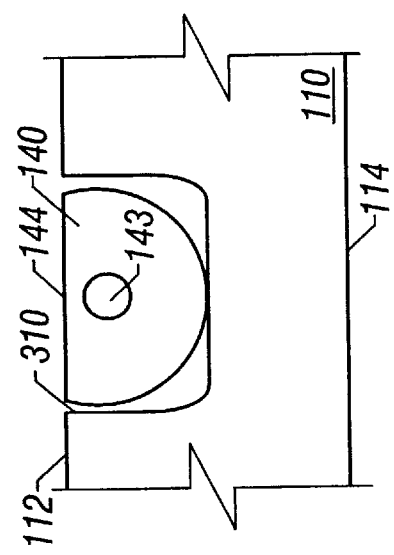

FIGS. 4A and 4B illustrate the fabrication of the V groove 320 and placement of the fiber 140 in the V groove 320 as shown in FIG. 3B. First, a mask layer 410 is deposited over the surface 112 of the substrate 110 and is patterned by a suitable technique such as a photolithography process to have one or more groove areas exposing the underlying substrate 110. Next, the exposed portions of the substrate 110 are anistropically etched to form V grooves.

If the substrate 110 is formed of a semiconductor, e.g., silicon, a thermally-grown silicon oxide or nitride film may be used as the etching mask 410 for anisotropic silicon etching. When the surface 112 is in the crystalline plane (100) of the Si substrate 110 and the groove patterns in the etching mask 410 are parallel to the crystalline plane (110), an etchant chemical such as alkaline (KOH) can be applied on the silicon (100) surface to produce truncated v-shaped grooves. Since the anisotropic etching is stopped at the crystalline plane (111), the dimension of the V grooves, such as the groove width and depth can be accurately controlled by properly selecting the dimension of the groove patterns formed in the etching mask 410.

Referring to FIG. 4B, after the grooves 320 are formed, the fibers 140 can be placed in the grooves 320 and bonded to the groves 320 at locations 420. The bonding may be implemented by a number of techniques, including but not limited to using an epoxy, glass frit thermal bond, or $CO_2$ assisted thermal bond. When multiple grooves 320 are formed, an array of fibers 140 can be precisely aligned in the grooves 320 with a predetermined spacing. The exposed cladding of the fiber 140 can then be removed and polished to form the flat surface 144 as shown in FIG. 3B.

Figure 5C:
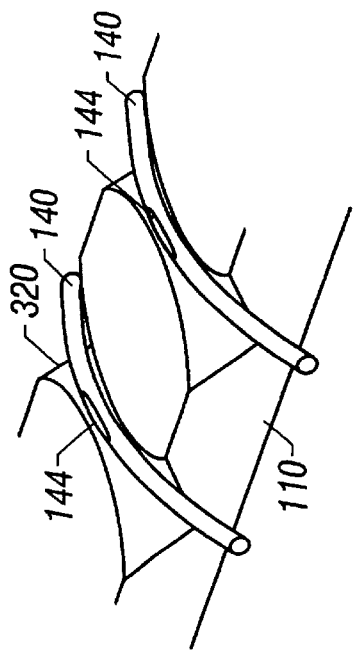
Figure 5B:
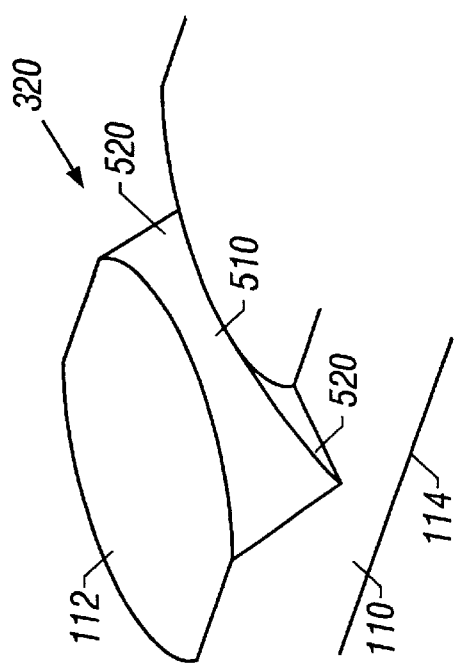
Figure 5A:
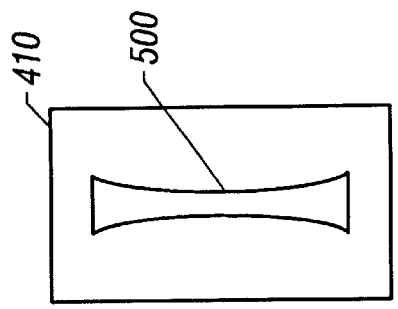
Figure 5E:
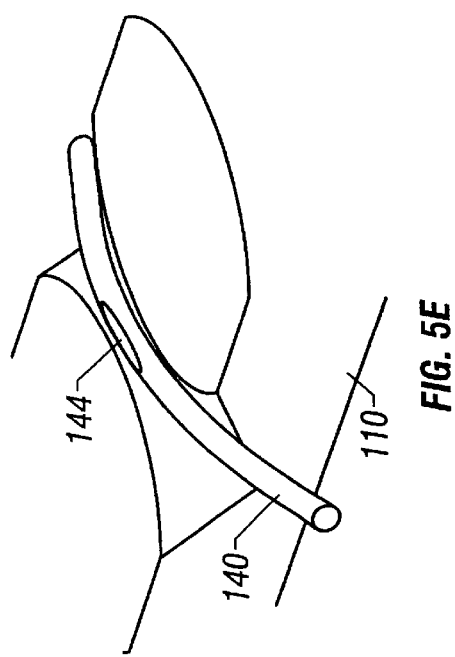
Figure 5D:
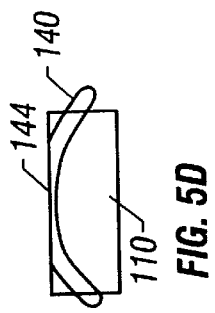

FIG. 5A shows one exemplary groove pattern 500 formed in the etching mask layer 430 in FIG. 4A. FIG. 5B illustrates the corresponding V groove 320 in the silicon substrate 110 formed from the anistropic etching by using the mask 500. The opening of the groove pattern 500 is designed to gradually widen from the center to both sides along the groove to be formed. Accordingly, the width and depth of the underlying V groove 320 also increase from the center portion 510 to side portions 520 that are spaced from the center along the groove 320. As illustrated, the surfaces of the V groove 320 are not flat but are curved as a result of etching through the above mask 500. FIGS. 5C, 5D, and 5E show the placement of fibers 140 in the above V-groove structure.

Figure 6:
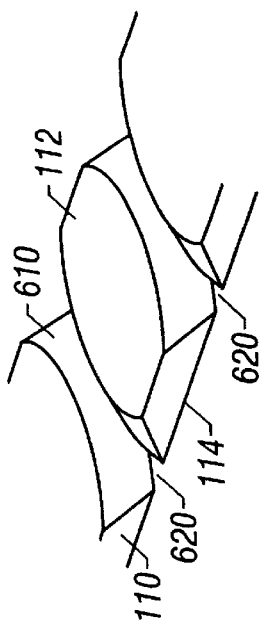
FIG. 6 illustrates formation of openings in V grooves by anistropic etching.

The above anistropic etching may be used to form both the V groove 320 and the openings 131 and 132 at both sides of the V groove 320 as shown in FIG. 1. Referring to FIG. 6, when opening of the groove pattern 500 in the etching mask 410 is sufficiently wide, side portions 620 of the V groove 610 can extend all the way through the substrate 110 from the surface 112 to the opposite surface 114 and hence create an opening 620 on the surface 114. The openings 620, therefore, can be used as the openings 131 and 132 to allow the fiber 140 to go through the substrate 110 from the surface 112 to the opposite surface 114.

Figure 7A:
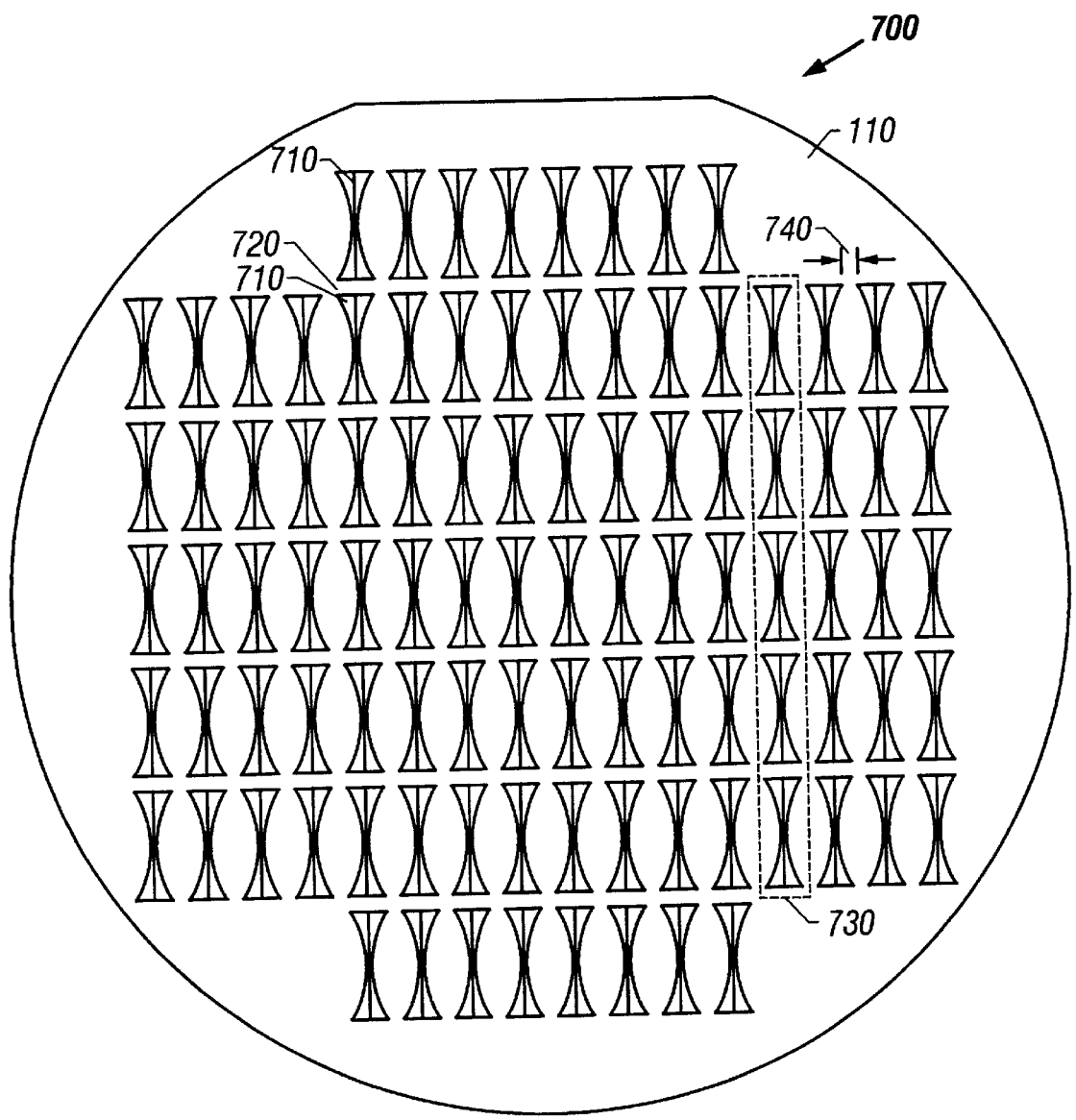
FIG. 7A shows a substrate that is fabricated with an array of grooves with openings.
Figure 7B:
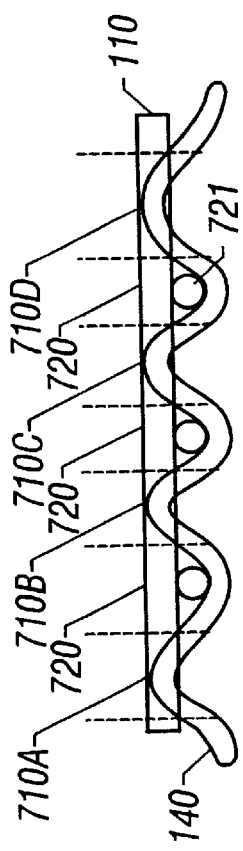
FIG. 7B shows a fiber device formed on a substrate with two or more grooves aligned with each other along a straight line on a single side of the substrate.

FIGS. 7A and 7B show that an array 700 of such V grooves 710 with two openings can be formed on one side of the substrate 110. The V grooves 710 may be aligned to be parallel to one another along their elongated directions and are arranged to form multiple parallel columns 730 with a spacing 740. Within each column 730, multiple V grooves 710 may be spaced from one another by a spacing 720. The substrate 110 with the array 700 may diced into multiple units each having one or more V grooves 710. Such units can be used to form various fiber devices. Hence, a batch fabrication process may be used to process the substrate 110 and to simultaneously form multiple fiber devices with V grooves 710.

A single fiber can be threaded through different V grooves 710 in a column 730 between the surfaces 112 and 114 via the openings 131 and 132. FIG. 7B shows an example where the fiber 140 is threaded through V grooves 710A, 710B, 710C, and 710D formed along a straight line on the surface 112 of the substrate 110. A spacer 721, such as a rod, may be optionally positioned on the surface 114 between the openings of two adjacent V grooves to provide a support to the fiber 140. Such support may be used to reduce sharp bending of the fiber 140 which may damage the fiber 140. After bonding and polishing the fiber 140, a coupling port is formed at each V groove on the surface 112 and is operable to couple optical energy out of or into the fiber 140. Therefore, this device has multiple coupling ports on the surface 112 to couple optical energy into or out of the fiber 140. When a proper control mechanism is implemented at each coupling port, optical switching, optical multiplexing, and other coupling operations may be achieved.

Figure 7C:
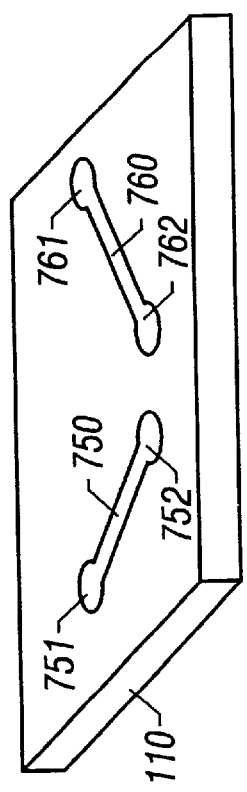
FIGS. 7C and 7D show fiber devices formed on a substrate with grooves on a single side of substrate that are oriented in different relative directions.
Figure 7D:
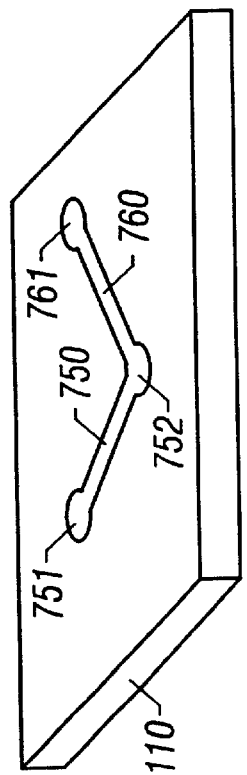

FIGS. 7C and 7D show additional embodiments of fiber devices that two different grooves 750 and 760 on the substrate 110 are not aligned along a straight line as in FIGS. 7A and 7B but form an angle with respect to each other. Numerals 751, 752, 761, and 762 indicate the openings of the grooves 750 and 760 that penetrate through the substrate 110. In FIG. 7C, the two grooves 750 and 760 are spaced from each other. A fiber may be placed in the grooves 750 and 760 by sequentially passing the fiber through the openings 761, 762, 752, and 751. In FIG. 7D, two grooves 750 and 760 are share a common opening 752. Such arrangements may be combined with aligned grooves.

Referring back to FIG. 1, the groove 120 with its two openings 131 and 132 may be formed on both sides 112 and 114 of the substrate 110 in the following manner. First, two adjacent grooves respectively formed in different sides of the substrate are aligned along the same groove direction. Second, the groove on one side shares an opening with the adjacent groove on the opposite side of the substrate 110. Techniques such as the double-sided photolithography may be used to form the V grooves on both surfaces of the substrate. Unlike the fiber device shown in FIG. 7B where the coupling ports are only on a single side of the substrate, a substrate with V grooves on both sides can form a fiber device with coupling ports on both sides of the substrate. Such double-sided coupling capability can provide flexible and versatile coupling configurations in various fiber devices.

Figure 8A:
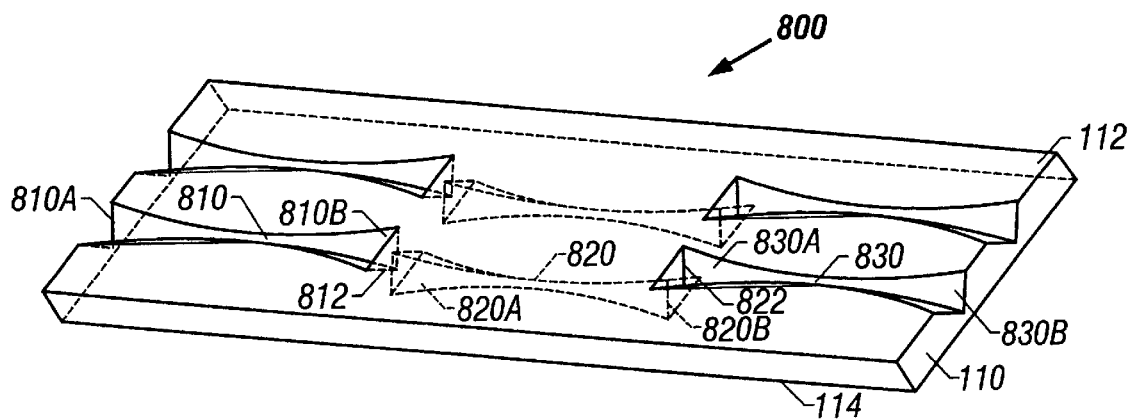
FIGS. 8A, 8B, 8C, 8D, and 9 illustrate substrates that are processed with grooves on both substrate surfaces.
Figure 8B:
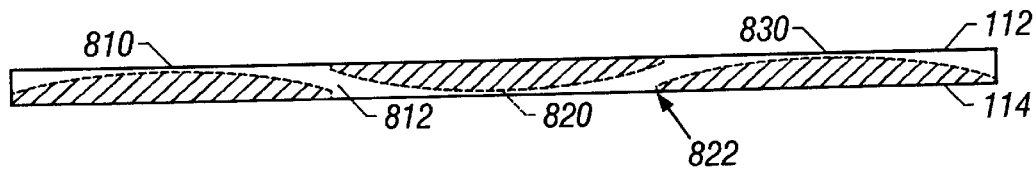
Figure 8C:
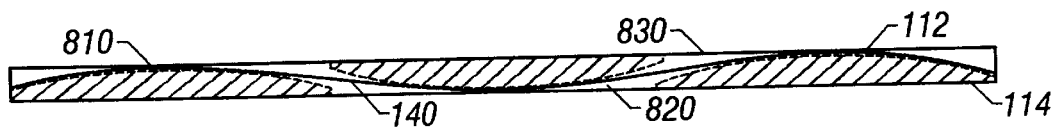

FIGS. 8A, 8B, and 8C illustrate one example of a fiber device 800 that has V grooves on both sides 112 and 114 of the substrate 110. A first V groove 820 is formed on the side 114. Similar to the V grooves in FIGS. 5B and 6, the depth and width of the V groove 820 increase from its center towards both ends 820A and 820B. A second, similar V groove 810 is formed on the opposite side 112 along the same groove direction. The end 810A of the second groove 810 overlaps with the end 820A of the first V groove 820 to create a through hole 812 that connects the V grooves 810 and 820. A third V groove 830 is also shown on the side 112 to have one end 830A overlap with the end 820B of the V groove 820 on the opposite side 114. A through hole 822 is then formed at the overlapping region to connect the V groove 820 to the V groove 830. A fiber 140 is shown in FIG. 8C to thread through the holes 812 and 822 to form coupling ports on both sides 112 and 114 of the substrate 110.

Figure 8D:
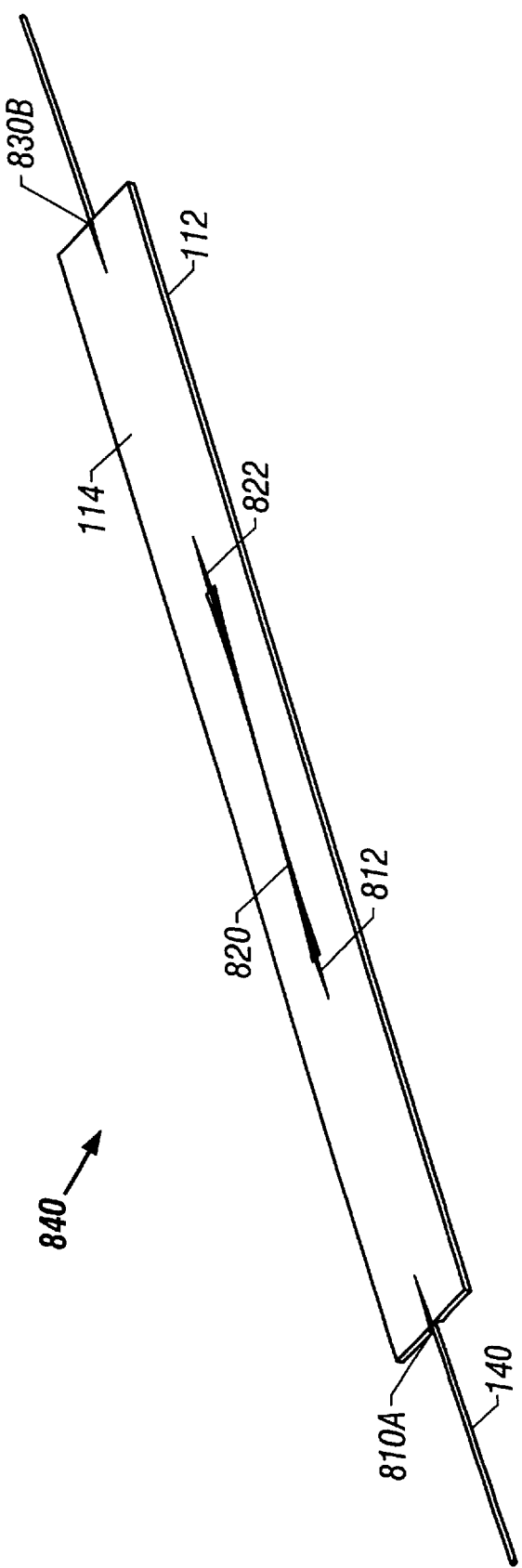
Figure 9:
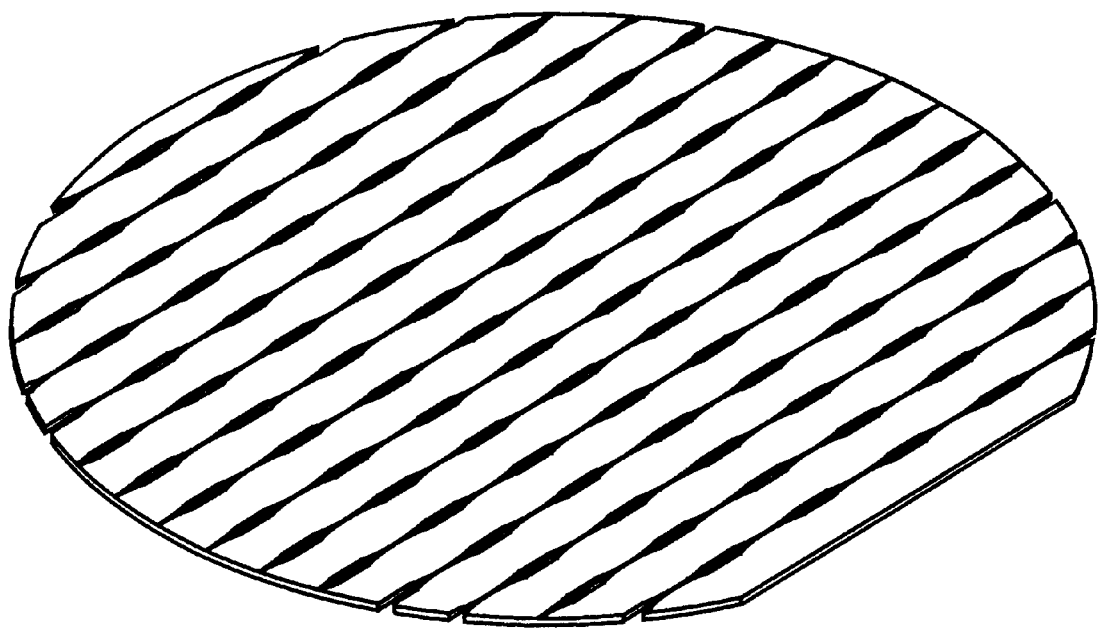

FIG. 8D shows a 3-port fiber device 840 that is formed by dicing a linear array of V grooves 810, 820, and 830 from the substrate 110. Comparing to the single-side device shown in FIG. 7B, the natural curvature of the V grooves formed on both sides eliminates the spacers 740. Similar to the batch fabrication of the single-sided devices shown in FIG. 7A, multiple double-sided devices may also be simultaneously fabricated from a single-sided substrate as illustrated in FIG. 9.

In the above devices with V grooves formed on both sides of the substrate, two adjacent V grooves, located on opposite sides of the substrate, may not be aligned along a straight line but form an angle with each other as illustrated by the adjacent grooves formed on the same side shown in FIGS. 7C and 7D. Similar to the grooves in FIGS. 7A and 7B, two adjacent V grooves, located on opposite sides of the substrate, may also be designed to spatially separate from each other without sharing a common opening that penetrates through the substrate and extends between two sides of the substrate.

The openings in the above examples of V grooves are formed by anistropically etching for forming the V grooves. Hence, there is no need to use a separate process to fabricate the openings if the etching mask is properly designed. However, a separate fabrication step may also be used to form n opening and to achieve any desired geometric shape of the opening that may be difficult or impossible to make through etching the V grooves.

Figure 10:
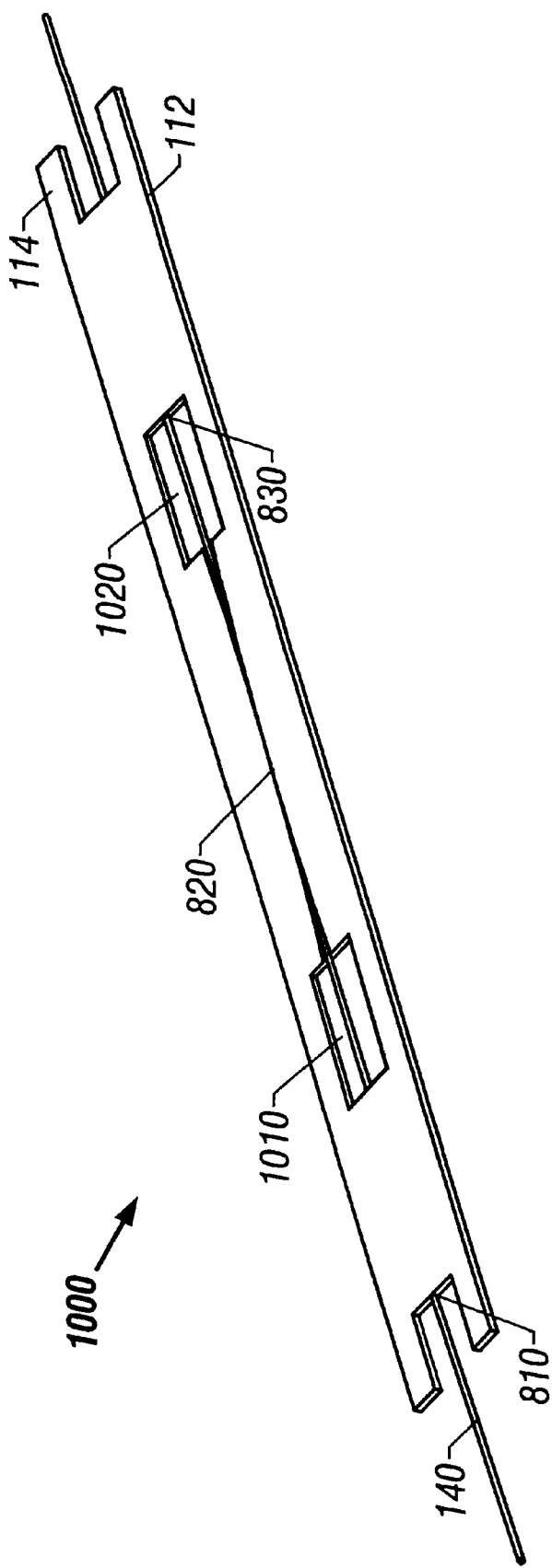
FIG. 10 shows a substrate processed with grooves on both substrate surfaces, where openings at both ends of each groove are separately fabricated from the V grooves.

FIG. 10 illustrates a fiber device 1000 with aligned V grooves 810, 820, and 830 on both sides 112 and 114 of the substrate 110 that are spaced from one another by rectangular openings 1010 and 1020. V grooves 810 and 830 are formed on the side 114 and the groove 820 is formed on the opposite surface 112 but is located between the grooves 810 and 830. An etching process separate from etching of the V grooves is needed to form such openings 1010 and 1020. Other processing techniques such as laser machining may also be used to form the openings.

The above fiber devices with V grooves either on one side or two sides may be used to form various fiber devices. Some exemplary devices are described below.

Figure 11:
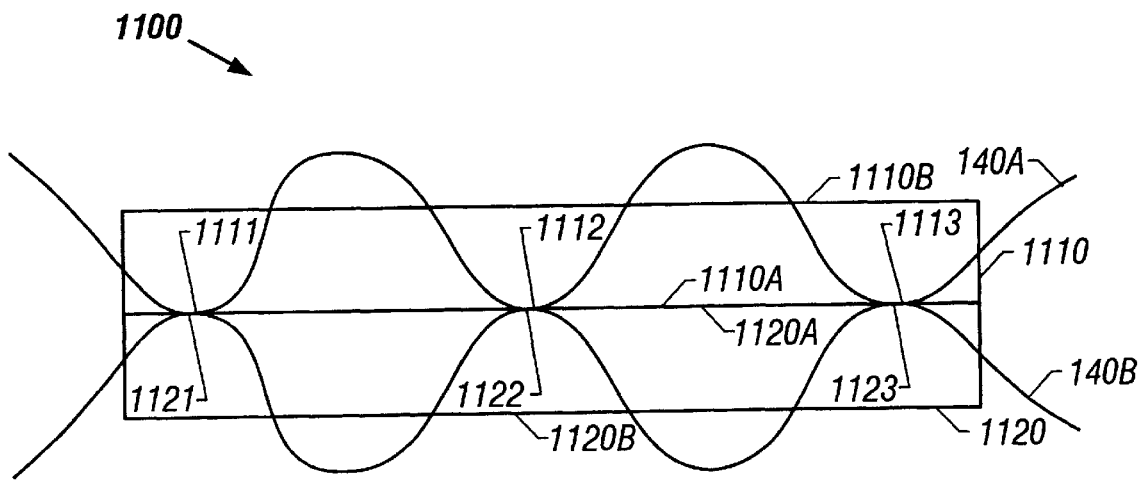
FIGS. 11 and 12 how exemplary fiber devices by integrating fibers to substrates with grooves.

FIG. 11 shows an optical fiber coupler 1100 by using two substrates 1110 and 1120 each with V grooves on a single surface of the substrate. The substrate 1110 has a surface 1110A on which three V grooves are fabricated and a fiber 140A is placed therein to form three coupling ports 1111, 1112, and 1113. Similarly, the substrate 1120 has a surface 1120A on which three V grooves are fabricated and a fiber 140B is placed therein to form three coupling ports 1121, 1122, and 1123. The two substrates 1110 and 1120 are engaged by having the surfaces 1110A and 1120A to face each other. The ports on one substrate substantially overlap with the coupling ports of another substrate to allow energy exchange between the fibers 140A and 140B. Various techniques may be used to engage the two substrates together, such as optical epoxy, glass frit thermal bond, CO2 laser assisted thermal bond.

A fiber device with V grooves on both sides of the substrate can be used to provide coupling on both sides.

More coupling flexibility can be achieved in such a device than a device with grooves on only one side. For example, each fiber in the device 1100 shown in FIG. 11 cannot be accessed from the exposed surfaces 1110B and 1120B. Such access would be possible if one of the two substrates 1110 and 1120 were designed to have grooves on both sides. Thus, three or more substrates may be vertically stacked together to form a multi-layer optical coupler. Since each substrate may have two or more fibers, coupling among many fibers in different substrates may be achieved.

Figure 12:
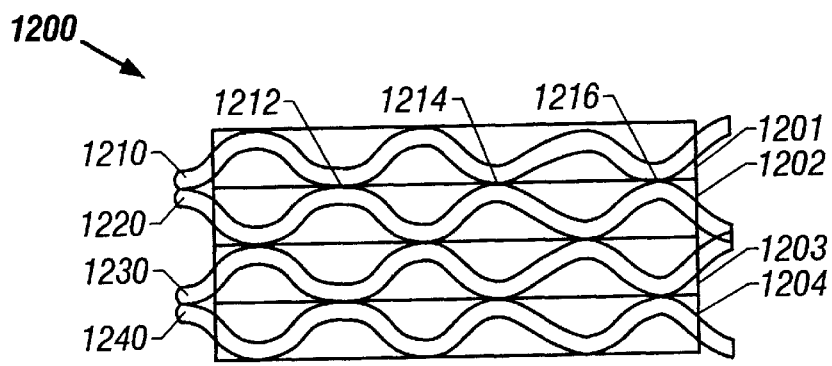

FIG. 12 shows a 4-layer optical multi-port coupler 1200 having 4 different double-sided substrates 1201, 1202, 1203, and 1204 based on the designs shown in FIGS. 8D or 10. Four different fibers 1210, 1220, 1230, and 1240 are respectively threaded in the substrates 1201, 1202, 1203, and 1204. Two adjacent substrates, such as 1201 and 1202, may be coupled to form the coupling ports 1212, 1214, and 1216. Hence, optical energy can be coupled between any two fibers. For example, an optical signal in the fiber 1210 may be coupled to the fiber 1230 by first coupling into the fiber 1220 and then coupling from the fiber 1220 into the fiber 1230. In general, a double-sided substrate can interface at both sides with other single-sided or double-sided substrates.

Figure 13A:
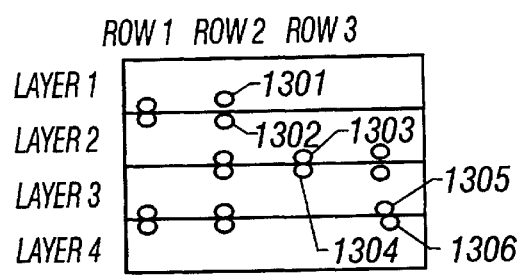
FIG. 13A shows uses of relative positions between grooves to control optical coupling between fibers positioned in the grooves.

FIG. 13A illustrates that optical coupling between two fibers in different layers may be controlled in a number of ways by controlling the relative position of the two fibers in grooves. For example, no optical coupling occurs between fibers 1301 and 1302 in the layers 1201 and 1202 when they are placed in deep grooves to have a separation much greater than one wavelength of the light. The fibers 1303 and 1304 in the layers 1202 and 1203 are positioned in shallow grooves so that a portion of each fiber's cladding is removed to allow for optical coupling. The depth of the grooves for the fibers 1303 and 1304 can be controlled to control the coupling strength via evanescent fields. The fibers 1305 and 1306, also in shallow grooves, are spatially offset in the lateral direction so that the optical coupling is reduced with the mount of the offset.

The grooves for holding fibers 1301 and 1302 are "deep" grooves in that the depth of the groove is greater than the diameter of the fiber so that the fiber cladding in the fiber portion in such grooves is not exposed above the substrate surface and no optical coupling port is formed. The grooves for holding the fibers 1303, 1304, 1305, and 1306, on the other hand, are "shallow" grooves as the groove 120 described with reference to FIG. 1 where a portion of a part of the fiber cladding protrudes above the substrate surface when the fiber is placed in such a groove and can be removed to form an optical coupling port 144. Such deep and shallow grooves may be combined to provide flexibility and versatility in routing fibers and arranging optical coupling ports in a fiber device.

Figure 13B:
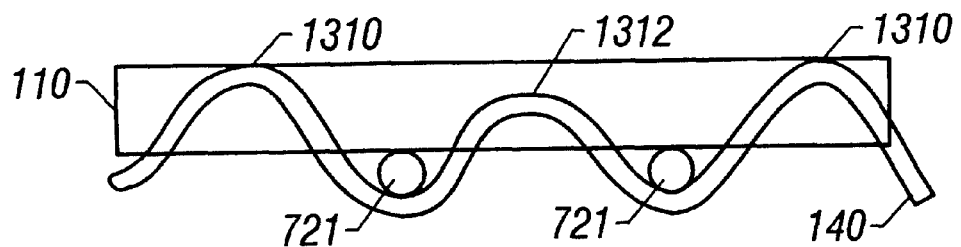
FIG. 13B shows a substrate with both deep and shallow grooves formed on a single side.
Figure 13C:
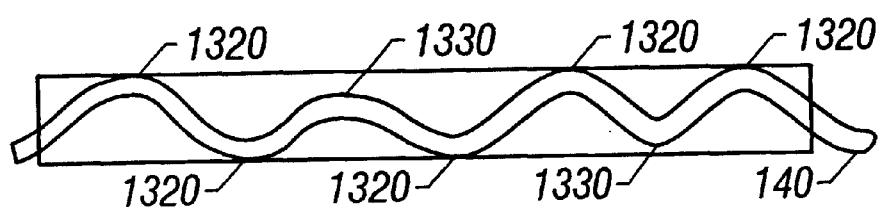
FIG. 13C shows a substrate with both deep and shallow grooves formed on both sides.

FIG. 13B shows a single-sided substrate similar to the substrate in FIG. 7B but processed to have both deep grooves 1312 and shallow grooves 1310. Each deep grove 1312 is used at a location where optical coupling is undesirable. FIG. 13C shows a double-sided substrate with deep grooves 1330 and shallow grooves 1320.

Figure 14:
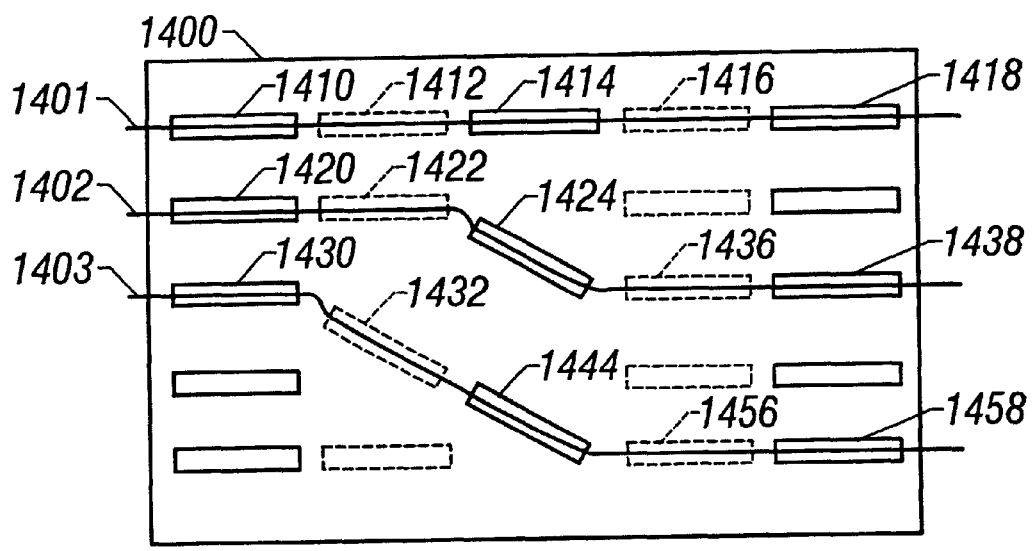
FIG. 14 shows an exemplary fiber device that has lateral jump-channel grooves on the substrate to change a direction of a fiber in the substrate plane.

FIG. 14 further shows that a lateral jump-channel groove 1424 on a substrate 1400 may be used to change the lateral direction of a fiber. The substrate 1400 is shown to have grooves on both sides. Solid elongated boxes such as 1410 represent grooves formed on one side and the dashed elongated boxes such as 1412 represent grooves formed on the other side. The grooves 1410, 1412, 1414, 1416, and 1418 are aligned with one another along a straight line to hold a fiber 1401. The groove 1424 is a lateral jump-channel groove that is oriented with an angle relative to adjacent grooves 1422 and 1436. Hence, a fiber 1402 can be threaded through the lateral jump-channel groove 1424 to run through grooves 1440 and 1422 and then to change its direction to run through grooves 1436 and 1438. Lateral jump-channel grooves 1432 and 1444 are also shown to direct the fiber 1402 from the groove 1430 to grooves 1456 and 1458. A single-side substrate with grooves on one side may also be designed to have such lateral jump-channel grooves.

Such a lateral jump-channel can be combined with the vertical integration of different double-side substrates to change the direction of an optical signal both laterally within a substrate and vertically from one substrate to another substrate. This opens up possibility similar to multi-layer printed circuit board technology allowing sophisticated connections from point to point and from layer to layer.

The above structures of fiber devices each having a fiber integrated or engaged to a substrate with at least two fiber coupling ports may be used to construct Mach-Zehnder interferometers in various configurations. The following sections describe several embodiments.

Figure 15:
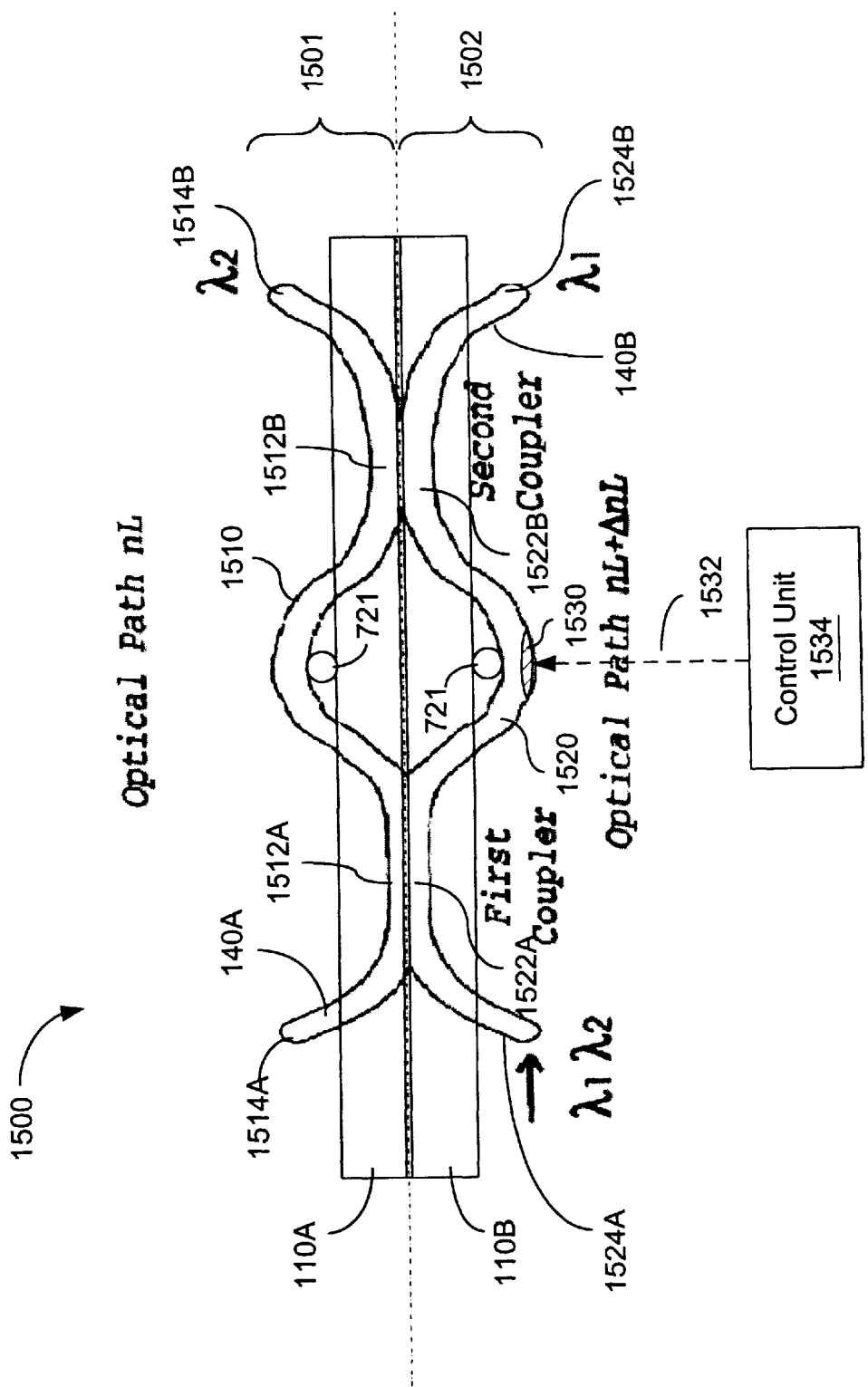
FIGS. 15, 16, 17, 18, and 19 show Mach-Zehnder interferometers based on single-sided half fiber couplers.

FIG. 15 shows a Mach-Zehnder interferometer 1500 by using two fiber modules 1501 and 1502 (i.e., two half fiber couplers) based on the single-side fiber device shown in FIG. 7B according to one embodiment. Two fibers 140A and 140B are integrated or engaged onto two separate substrates 110A and 110B, respectively. Each fiber has two adjacent coupling ports which are used to couple with respective coupling ports in another fiber-to form the two joint ports of the Mach-Zehnder interferometer.

In the half fiber coupler 1501, the fiber 140A has an input terminal 1514A and an output terminal 1514B. A fiber segment 1510 between fiber coupling ports 1512A and 1512B is one of two optical paths for the Mach-Zehnder interferometer. The other half fiber coupler 1502 is similarly constructed to the extent that the fiber 140B has input and output terminals 1524A, 1524B, fiber coupling ports 1522A, 1522B, and a fiber segment 1520 as the other optical path for the Mach-Zehnder interferometer. The two half fiber couplers 1501 and 1502 are engaged to each other by aligning their fiber coupling ports, i.e., the port 1512A to the port 1522A, and the port 1512B to the port 1522B, respectively, to form a 2-input and 2-output device. This engagement may be achieved by using, among other techniques, an epoxy, glass frit thermal bond, or $CO_2$ assisted thermal bond. The joint ports formed by the fiber coupling ports 1512A and 1522A, and by the fiber coupling ports 1512B and 1522B may be 3-dB directional couplers.

The optical path lengths of the fiber segments 1510 and 1520 in fibers 140A and 140B are generally different so that a proper relative phase shift between the signals in the two fibers 140A and 140B can be obtained to couple one or more desired WDM channels from one fiber (e.g., the fiber 140B) to the other fiber (e.g., the fiber 140A) while other WDM channels remain in the original fiber (e.g., the fiber 140B). A number of techniques may be used to achieve this desired relative phase shift.

One technique is to create a fixed difference in the optical path lengths of the two fiber segments 1510 and 1520 by doping or UV exposing a portion of one of the fiber segments 1510 and 1520. The doping or UV exposing is designed in such a way that one or more selected wavelengths received in one fiber prior to the joint port formed by ports 1512A and 1522A will be coupled to the other fiber after the joint port formed by ports 1512B and 1522B. This processing produces a fixed Mach-Zehnder interferometer.

Another technique is to create an adjustable difference in the optical path lengths of the two fiber segments 1510 and 1520 so that different wavelengths received in one fiber prior to the joint port formed by ports 1512A and 1522A may be selected, in accordance with a control signal 1532, to couple to the other fiber after the joint port formed by ports 1512B and 1522B. FIG. 15 shows that, the fiber segment 1520 is designed to include an adjustable section 1530 that can change the relative phase difference between the fiber segments 1510 and 1520 in response to the control signal 1532. This may be implemented as a mechanism to change the physical length of the fiber segment 1520, or the index of the entire or a portion of the fiber segment 1520, or a combination of both. The index change may be a change in the index of the fiber core, or the index of the fiber cladding, or a combination of both. A control unit 1534 is provided to generate and adjust the control signal 1532. For example, at a first value of the control signal 1532, a WDM channel at a wavelength, $\lambda_1$, in the input WDM channels received by the fiber 140B may be coupled to the fiber 140A while other WDM channels remain in the fiber 140B; when the control signal 1532 is set to a second value, a different WDM wavelength, $\lambda_2$, in the input WDM channels received by the fiber 140B may be coupled to the fiber 140A while the channel at the wavelength, $\lambda_1$, and other WDM channels remain in the fiber 140B. Hence, the implementation of the section 1530 allows the device 1500 to operate in a dynamic or programmable manner in signal multiplexing or demultiplexing.

The above index-changing section 1530 in the fiber segment 1520 may be realized in a number of ways. For example, a thermal heating element, such as a thin-film heater, may be coupled to the fiber segment 1520 to form the section 1530 so that the refractive index (and the length) can be controlled by controlling the local temperature. Also, the adjustable section 1530 may be designed to exhibit the electro-optic effect so that an external electrical field may be applied as the control signal 1532 to change its refractive index. In addition, the adjustable section 1530 may be photosensitive and the control signal 1532 may be an optical beam that controls and changes the refractive index of the section 1530 by the power level of the control optical beam.

Figure 16:
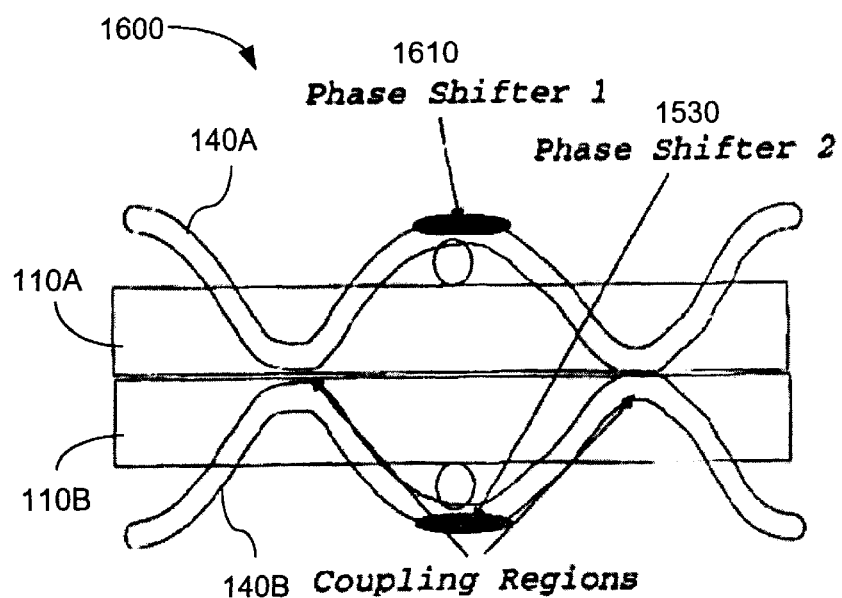

FIG. 16 shows another adjustable Mach-Zehnder interferometer 1600 based on the above design by using an additional index-changing section 1610 in the fiber 140A. The index-control mechanisms of the two index-changing sections 1530 and 1610 in the two different fiber segments 1520 and 1510 may be the same or different.

Figure 17:
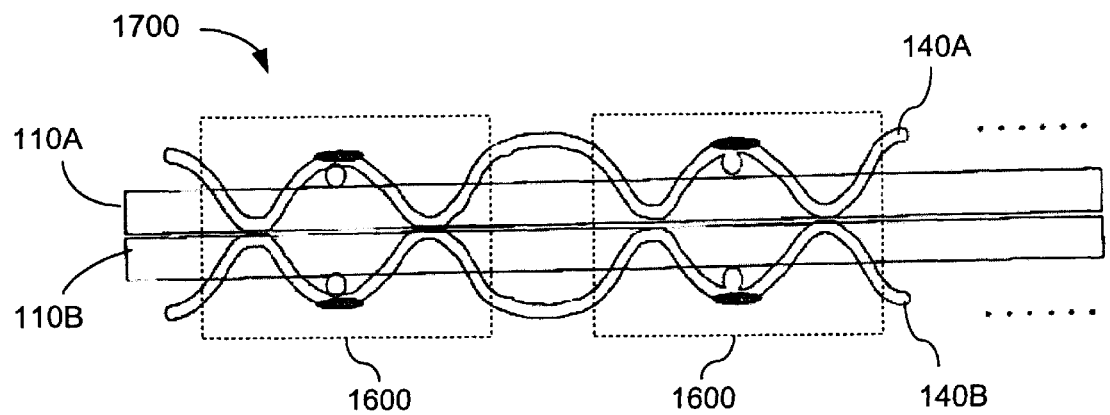

Two or more of the above Mach-Zehnder interferometers, in either configurations with the fixed or adjustable phase shifts, may be formed in two fibers 140A and 140B in a cascaded configuration. FIG. 17 shows one exemplary device 1700 with multiple adjustable Mach-Zehnder interferometers 1600 in FIG. 16. Fixed and adjustable Mach-Zehnder interferometers in the fibers 140A and 140B may also be combined in a cascaded configuration.

Figure 18:
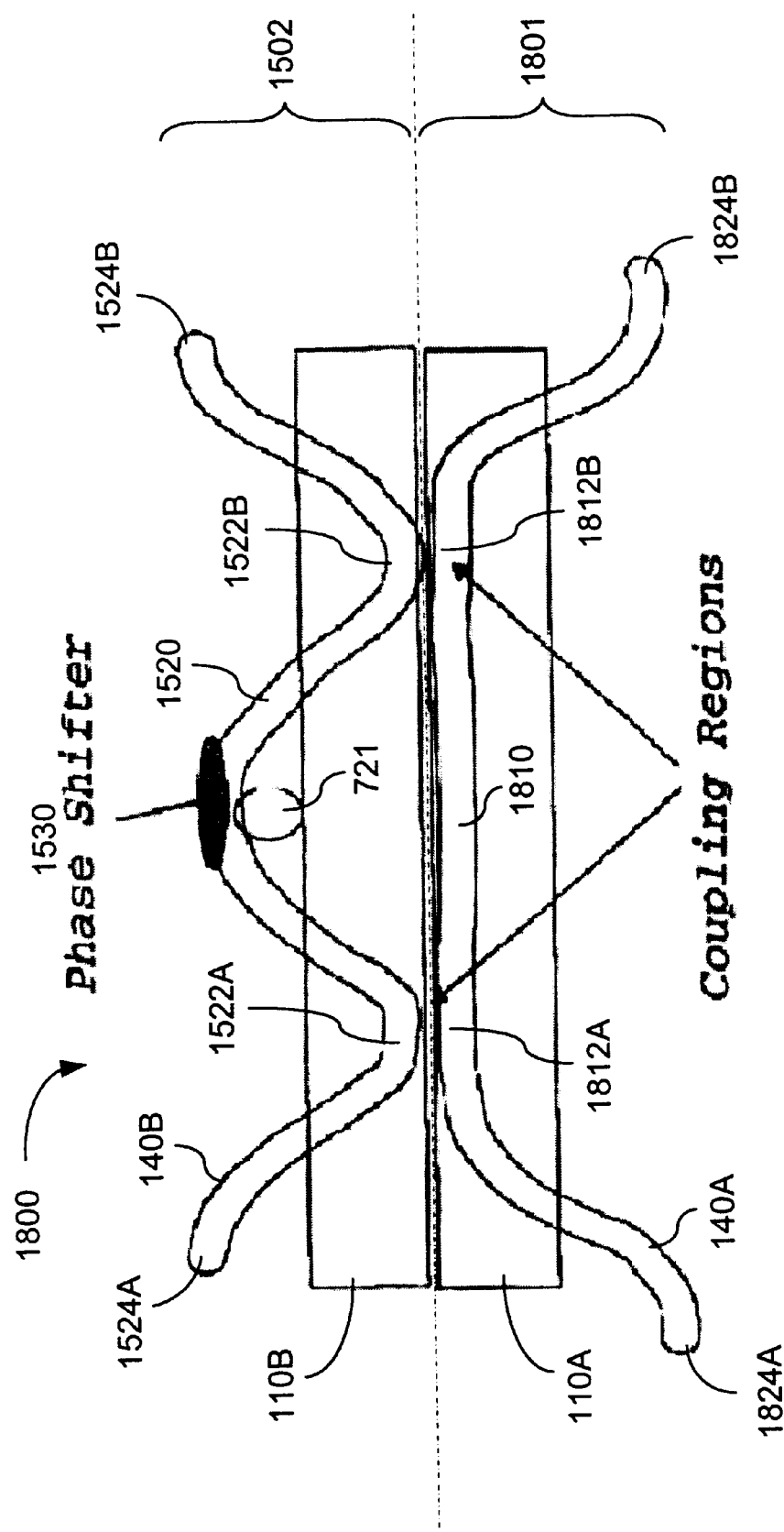
Figure 19:
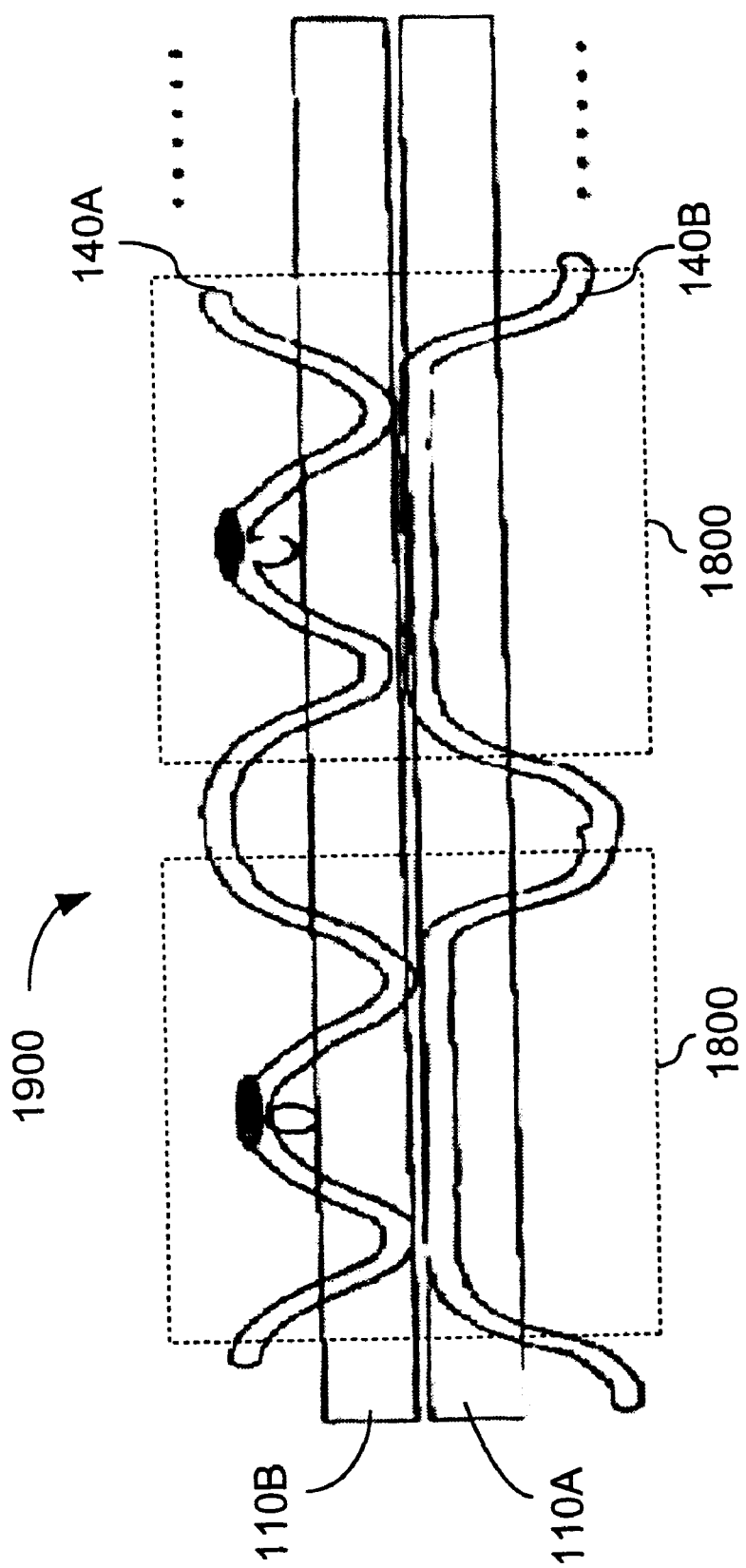

FIG. 18 shows a Mach-Zehnder interferometer 1800 according to another embodiment. Two half fiber couplers 1801 and 1502 have structurally different designs. The half fiber coupler 1801 uses a substrate 110A with an elongated groove that extends over a length of the spacing between two coupling ports 1522A and 1522B in the half fiber coupler 1502. The fiber 140A engaged to the substrate 110A, hence, has a fiber segment 1810 positioned in this extended groove that is side polished to form a fiber coupling port extended over at least the spacing between two coupling ports 1522A and 1522B in the half fiber coupler 1502. The devices 1801 and 1502 are engaged to each other to align the coupling ports 1522A and 1522B of the fiber 140B to two coupling portions 1812A and 1812B of the extended coupling port 1810 in the fiber 140A. Similar to the Mach-Zehnder interferometer 1500, the Mach-Zehnder interferometer 1800 may be a fixed or adjustable device. The adjustable device may use an index-changing section 1530 in the fiber 140B. Alternatively, an index-changing section may also be formed in the extended coupling port 1810. FIG. 19 shows an exemplary device 1900 with multiple adjustable Mach-Zehnder interferometers 1800. Fixed and adjustable Mach-Zehnder interferometers in the fibers 140A and 140B may also be combined in a cascaded configuration.

Figure 20:
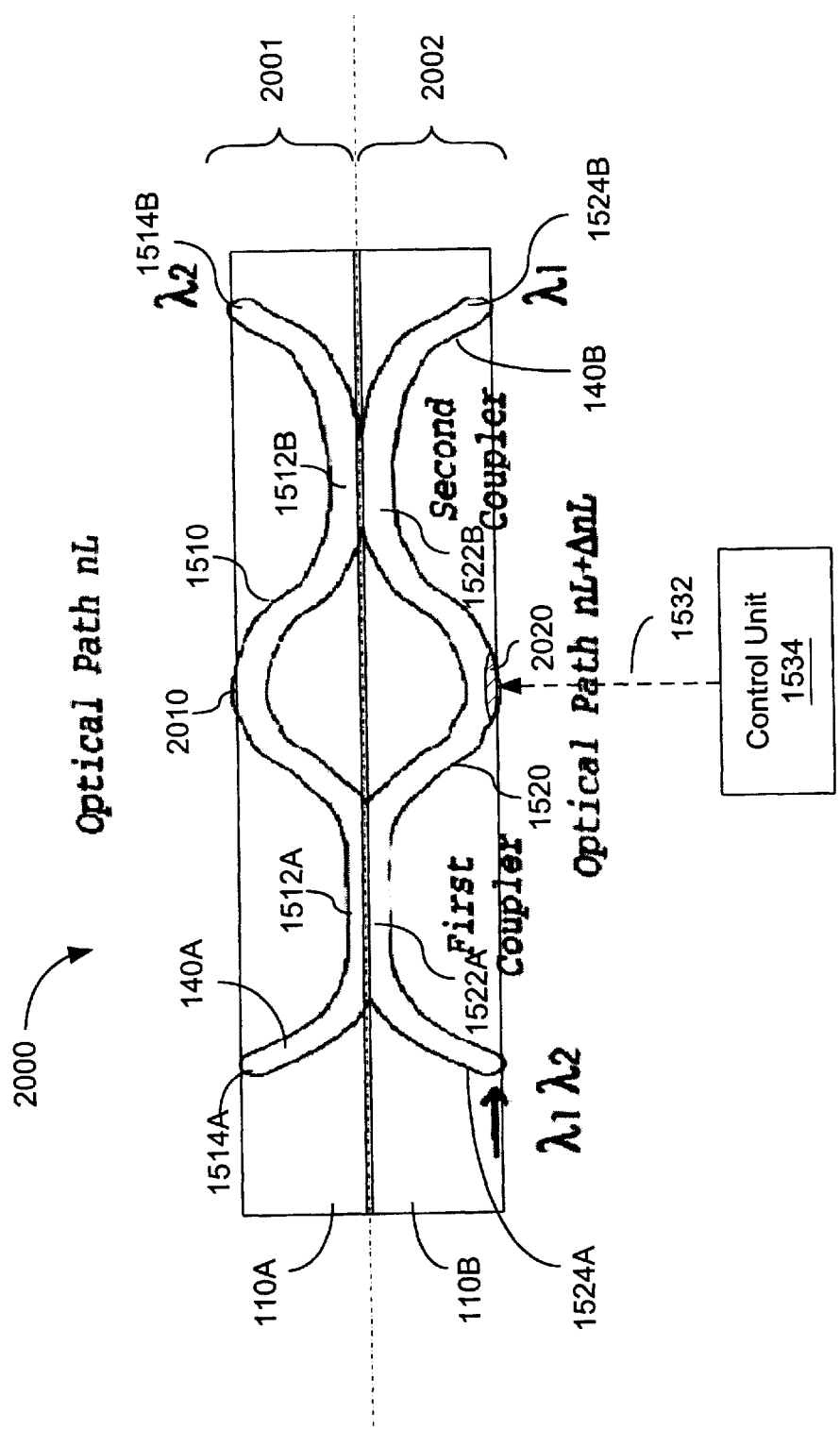
FIGS. 20 and 21 show examples of Mach-Zehnder interferometers that use at least one double-sided half fiber coupler.

Devices shown in FIGS. 15 through 19 use single-sided half fiber couplers 1501, 1502, and 1801. Double-sided had fiber couplers shown in FIGS. 8A, 12, and 13 and 13C may also be used to form fixed or adjustable Mach-Zehnder interferometers. FIG. 20 shows that, two double-sided half fiber couplers 2001 and 2002 are used to form a Mach-Zehnder interferometer 2000 similar to the device 1500 shown in FIG. 15. Different from the device 1500 in FIG. 15, two additional coupling ports 2010 and 2020 are respectively present in the fiber segments 1510 and 1520 on the substrate surfaces opposite to the interfacing substrate surfaces. At least one of the coupling ports 2010 and 2020 may be configured to have a variable refractive index so that a control unit 1534 could be used to control the phase shift of the device through a control signal 1534. Mach-Zehnder interferometers in other configurations as shown in FIGS. 17, 18, and 19 may also be constructed by using double-sided half fiber couplers. In particular, a single-sided half fiber coupler and a double-side half fiber coupler may be engaged to form a Mach-Zehnder interferometer.

Figure 21:
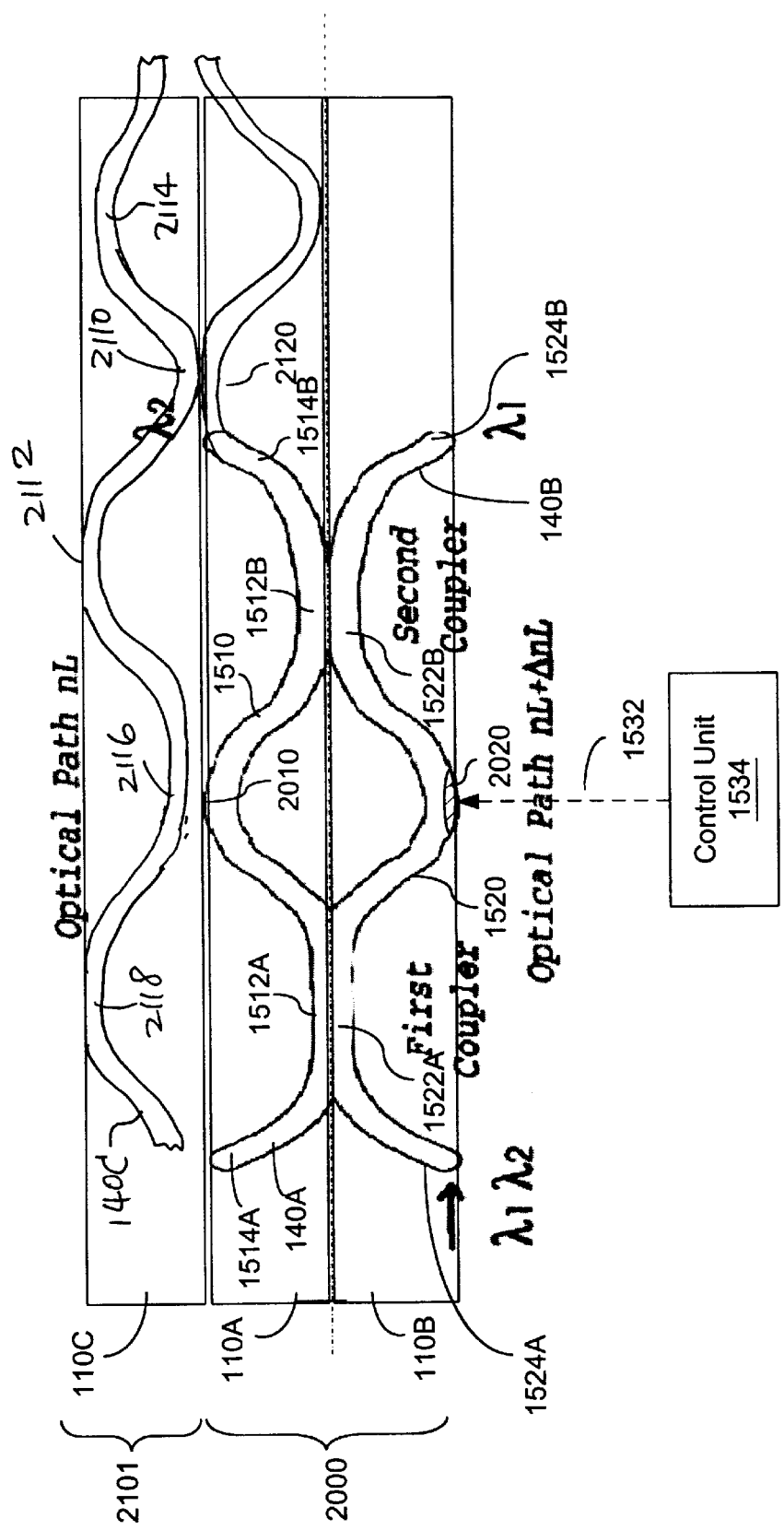

One advantage of using at least one double-sided half fiber coupler in a Mach-Zehnder interferometer is that both sides of the substrate have fiber coupling ports and hence three or more half fiber couplers may be stacked together in a wide range of coupling configurations. FIG. 21 shows one stacking example in which the Mach-Zehnder interferometer 2000 in FIG. 2 is engaged to another half fiber coupler 2101 formed on a substrate 110C so that the fiber 140A integrated or engaged to the substrate 110A can be optically coupled to a third fiber 140C in the separate substrate 110C. The half fiber coupler 2101 is shown to be a double-sided fiber coupler but it is understood that it could also be a single-sided coupler.

In the exemplary embodiment in FIG. 21, the fiber 140C is integrated or engaged to elongated grooves in the substrate 110C to form at least one fiber coupling port 2110 on one substrate surface to interface with the fiber 140A. The substrate 110A is fabricated to have an additional shallow groove to form another fiber coupling port 2120 for coupling with the fiber 140C through the port 2110 therein. Hence, depending on the coupling configuration of the joint section between the coupling ports 2110 and 2120, the fiber 140C may, through the coupling port 2120, supply one or more additional channels into the fiber 140A or receive one or more additional channels from the fiber 140A.

Notably, deep grooves may be formed where fiber coupling ports are not needed in the device in FIG. 21. For example, the substrate 110C is shown to have two deep grooves 2114 and 2116 so that fiber segments engaged thereto are buried in the substrate 110C and are not polished by removing fiber cladding for evanescent coupling. In particular, the deep groove 2116 is located at the coupling port 2010 of the fiber 140A to avoid interference with the operation of the Mach-Zehnder interferometer 2000. Additional fiber coupling ports, such as 2118 and 2112, in the fiber 140C may be formed on the substrate surface facing away from the device 2000 to allow for additional coupling with the fiber 140C.

It is further contemplated that, the above evanescent coupling between two or more side-polished fibers may be applied to evanescent coupling between one side-polished fiber and a planar waveguide. Such evanescent optical coupling may be used to construct a variety of fiber-compatible optical devices and systems with unique and versatile applications. For example, optical devices based on planar waveguide technology and optical devices based on fiber technology may be integrated in one package. A planar waveguide in this context is construed as a non-fiber waveguide formed on a substrate which may include planar waveguides in various configurations, such as a one-dimensional planar waveguide (e.g., a slab waveguide), a two-dimensional planar waveguide (e.g., a channel waveguide and a ridged waveguide), and a three-dimensional planar waveguide (e.g., a waveguide region surrounded on all sides by a confining medium of lesser refractive index).

The evanescent optical coupling between the planar waveguide and the fiber may also be accomplished by evanescent field coupling. One of advantages of this evanescent coupling technique is the reduced insertion loss compared to a conventional end-to-end coupling between an end facet of the planar waveguide and an end facet of the fiber. The end-to-end coupling couples the energy between the fiber and the waveguide along their optical axes and can have significant loss due to the dissimilarity in the cross sectional geometries of the generally circular fiber core and the generally rectangular waveguide. The evanescent coupling can also reduce difficulty in the alignment of optical fiber to the planar waveguide compared to the end-to-end interconnection.

In particular, the evanescent coupling technique can allow novel interconnections between planar waveguides and fibers that would be difficult to achieve with end-to-end coupling scheme. For example, two planar waveguides formed on the same substrate may be coupled to exchange optical energy. A fiber may be coupled to one of the two waveguides to couple optical energy output that waveguide or inject an optical signal into the waveguide. This essentially provides a three-dimensional coupling scheme since the optical energy is transferred between different waveguides in the waveguide plane on the waveguide substrate and is transferred out of the waveguide plane to the fiber. As another example for the three-dimensional coupling, two or more layers of waveguides formed on different waveguide substrates may be stacked in the vertical dimension by using a fiber device to interconnect two adjacent layers of waveguides. In one implementation, a double-sided fiber module shown in FIG. 8C may be coupled two waveguide modules on its two surfaces to allow optical coupling between the two waveguide modules. Therefore, planar waveguide substrates can be stacked in various configurations. As a result, sophisticated optical circuitry can be formed, e.g., in configurations similar to circuits in printed circuit board technology.

Figure 22A:
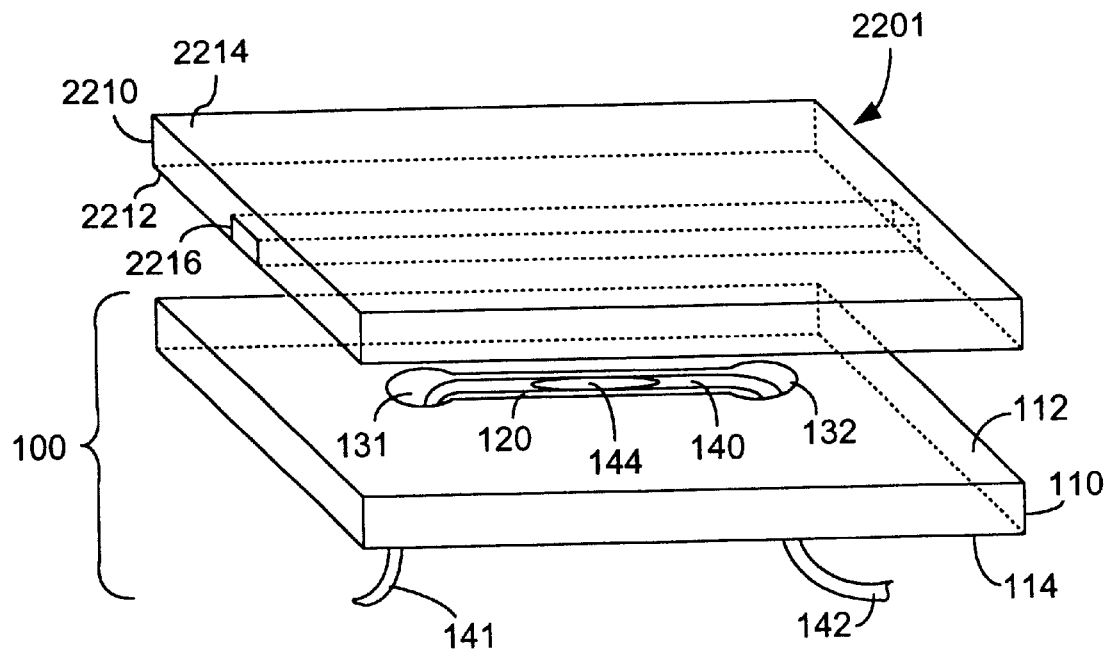
FIGS. 22A, 22B, 23, and 24 show embodiments for optical coupling between a fiber and a planar waveguide via evanescent fields.
Figure 22B:
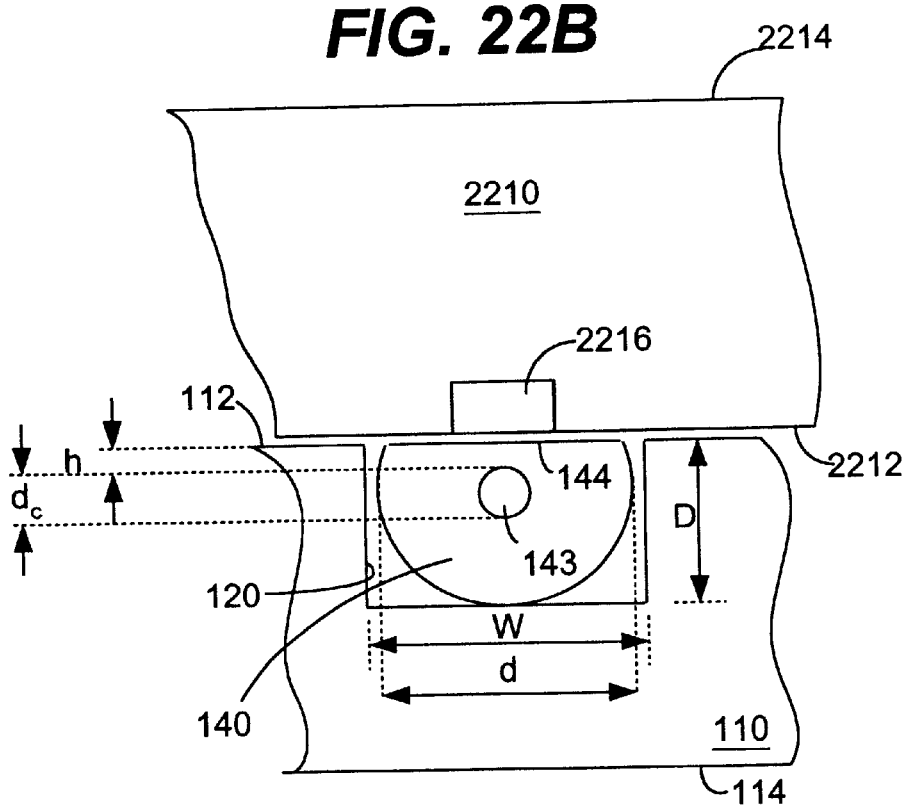

FIGS. 22A and 22B show one exemplary coupling between a fiber 140 and a planar waveguide 2216. The fiber 140 is integrated or engaged to a substrate 110 of a half fiber coupler 100 as shown in FIG. 1 in either a single-sided or a double-sided configuration. The planar waveguide 2216 is formed in a waveguide module 2201 where the waveguide 2216 is in another substrate 2210. The waveguide 2216 as shown is an example of a two-dimensional planar waveguide which is buried in the substrate 2210 as a channel waveguide so that all its sides except one are surrounded by the substrate 2210. This channel waveguide geometry may be formed by various techniques, e.g., implanting proper dopants in the selected region of the substrate 2210. The waveguide module 2201 may include other optical, opto-electronic, or MEMS elements on the substrate 2210 in addition to the planar waveguide 2216. The substrate 2210 includes two parallel and opposing substrate surfaces, 2212 and 2214, that are generally flat and may be polished. The waveguide 2216 is formed over the substrate surface 2212 to interface with the fiber 140 in the fiber module 100. A part of the waveguide 2216 may be used to form a waveguide coupling port for interfacing with a fiber coupling port.

FIG. 22B further shows that the waveguide module 2201 is positioned with the substrate surface 2212 facing the substrate surface 112 to place the coupling port of the waveguide 2216 adjacent to the fiber coupling port 144. The waveguide 2216 is in the evanescent field of the optical signal in the fiber core 143. The surface 2212 may be directly in contact with the surface 112 or be spaced from the surface 112 in the order of or less than one wavelength of the optical signal.

Figure 23:
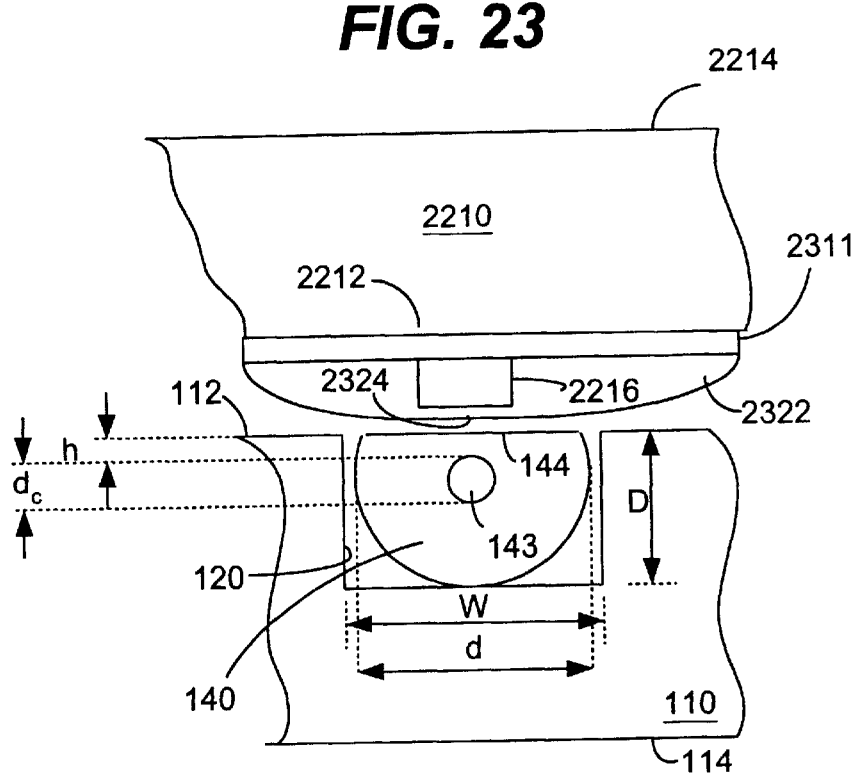

FIG. 23 shows a waveguide 2216 in a ridge configuration where the waveguide 2216 is sandwiched between two lower index cladding layers 2311 and 2322 formed over the surface 2212 of the substrate 2210. A portion of the top cladding layer 2322 is removed to form a coupling port 2324 to interface with the fiber coupling port 144.

Figure 24:
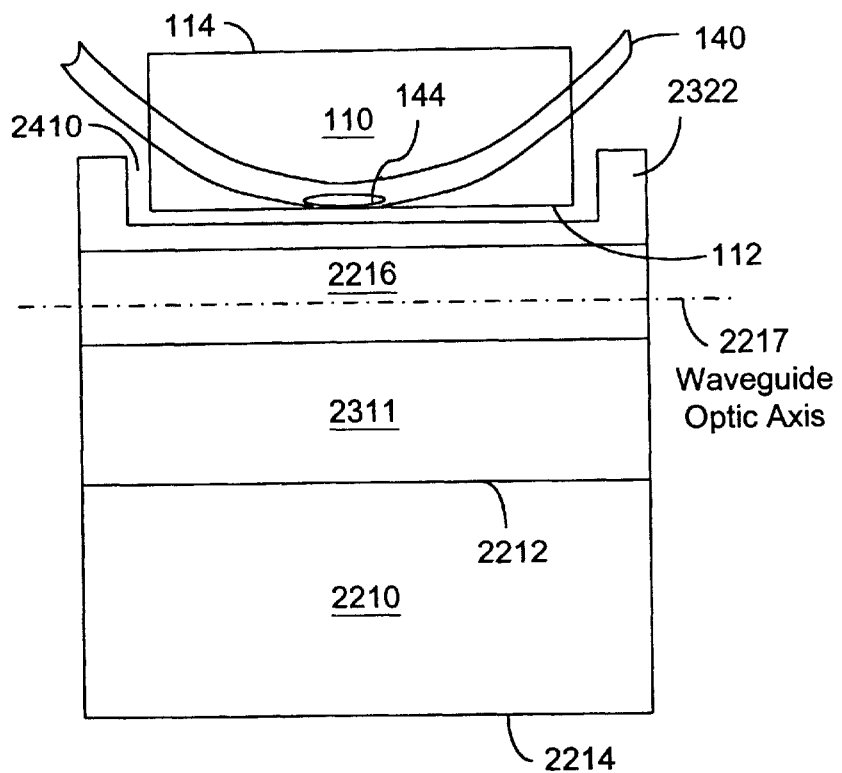

FIG. 24 shows a waveguide 2216 in a slab configuration where the waveguide 2216 is sandwiched between two lower index cladding layers 2311 and 2322 formed over the surface 2212 of the substrate 2210. An opening 2410 is fabricated in the top cladding layer 2322 so that the fiber device 100 may be positioned to place the fiber coupling port 144 close to the waveguide 2216 for evanescent coupling.

Figure 25:
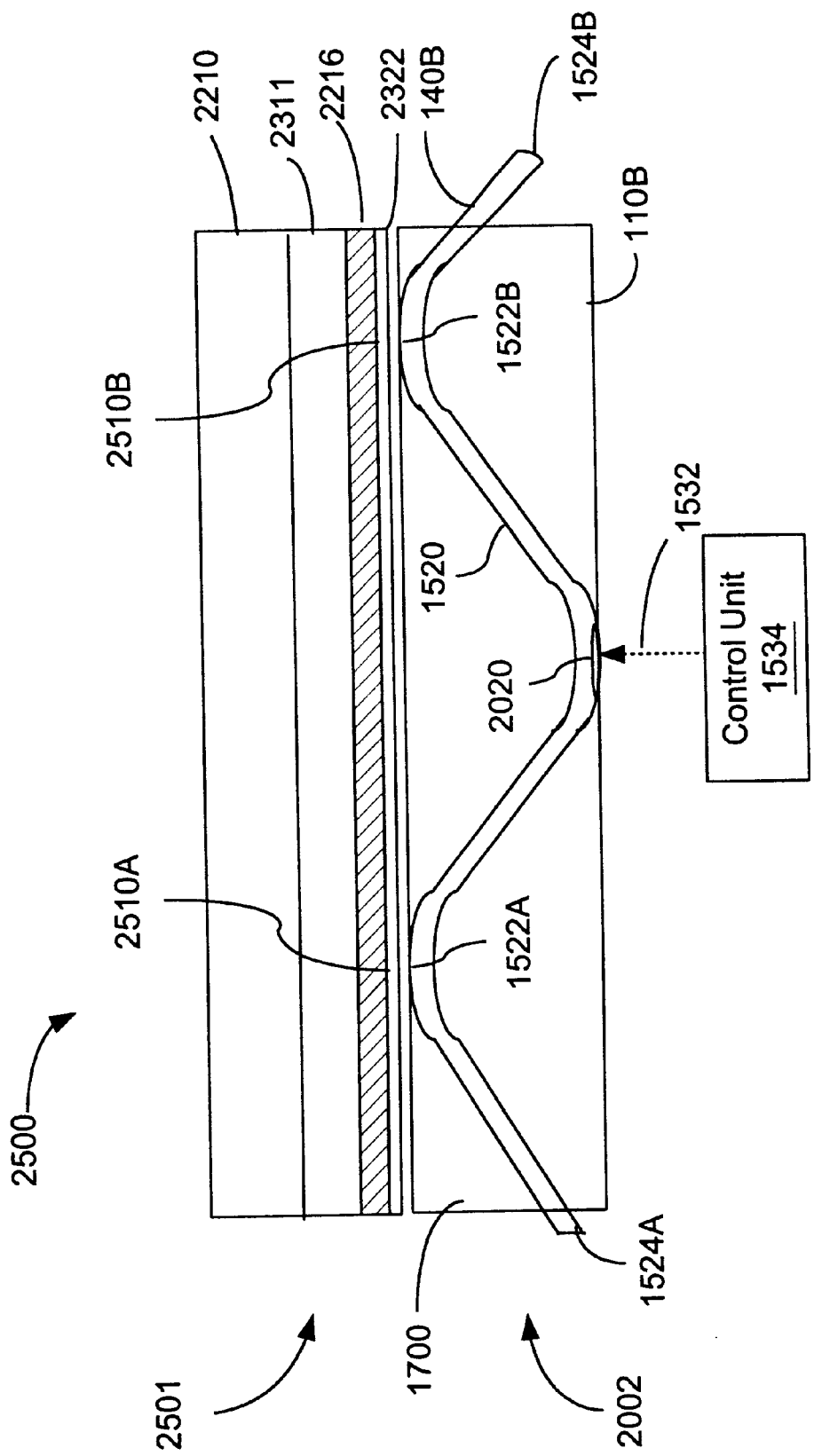
FIG. 25 shows one embodiment of a Mach-Zehnder interferometer formed by coupling between a fiber and a planar waveguide.

The above fiber-waveguide coupling ports shown in FIGS. 22A through 24 may be used to form fixed and adjustable Mach-Zehnder interferometers. FIG. 25 shows one example in which a waveguide module 2501 with a waveguide 2216 formed on a substrate 2210 and a half fiber coupler 2002 with a fiber 140B formed on a substrate 110B are coupled to form a 2-input and 2-output Mach-Zehnder interferometer 2500. The fiber coupling ports 1522A and 1522B interface with portions 2510A and 2510B of the waveguide 2216 to form the input and output 3-dB directional couplers. The index-changing section 2020 is shown to locate in the fiber 140B. Alternatively, it may also be in the waveguide 2216 between the portions 2510A and 2510B. In addition, the waveguide 2216 may be optically coupled to one or two other waveguides formed over the substrate 2210 to achieve optical coupling. For example, another planar waveguide formed within the plane of the substrate 2210 may be engaged and coupled to the waveguide 2216 at a location outside the section between the joints 2510A and 2510B.

It is also contemplated that, a diffraction grating may be formed in the interface between the fiber 140 and the waveguide 2216 in the above waveguide-fiber coupling schemes to assist or facilitate the optical coupling. The grating has a periodic grating pattern along the fiber 140 or the waveguide 2216. This grating-assisted coupling may be desirable to obtain a high efficiency in the optical coupling. This is in part because it may be difficult to match a guided optical mode in the waveguide 2216 to a guided optical mode in the fiber 140 due to factors such as the differences in the refractive indices, the cross section geometries of the waveguide 2216 and the fiber core in the fiber 140, and the cladding structures.

Figure 26A:
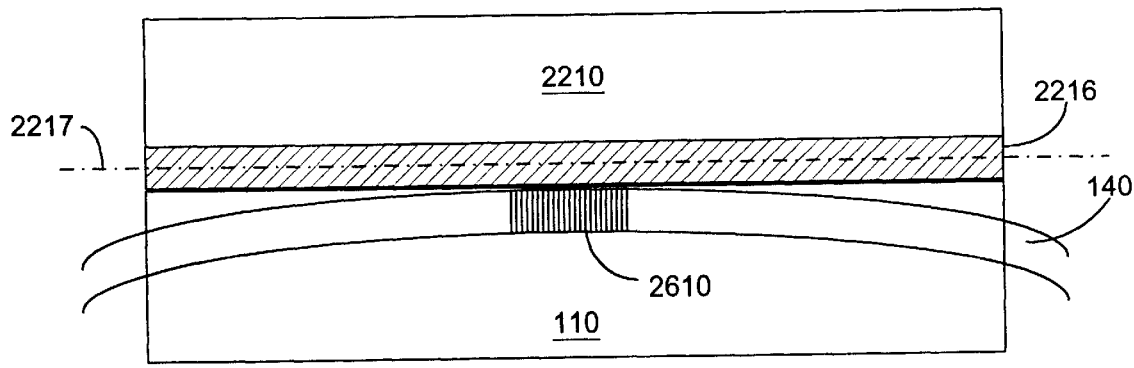
FIGS. 26A, and 26B, and 26C illustrate implementations of a Mach-Zehnder interferometer based on evanescent coupling between a fiber and a planar waveguide with an optical grating.
Figure 26B:
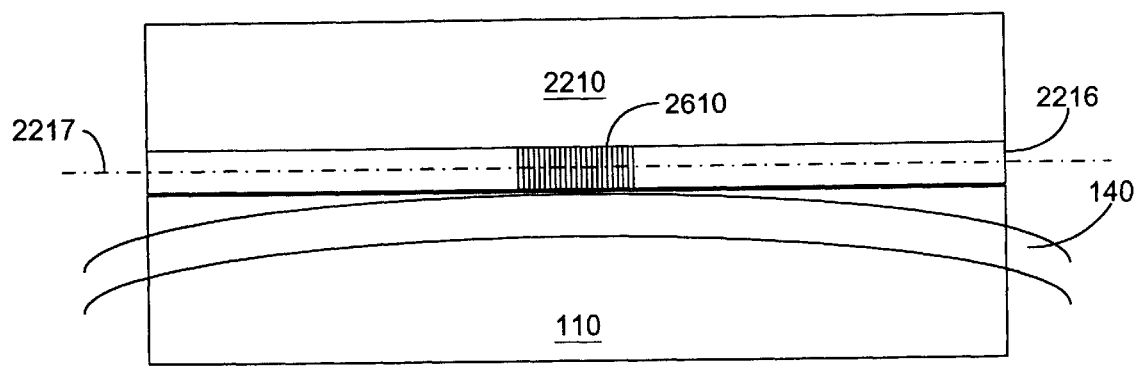
Figure 26C:
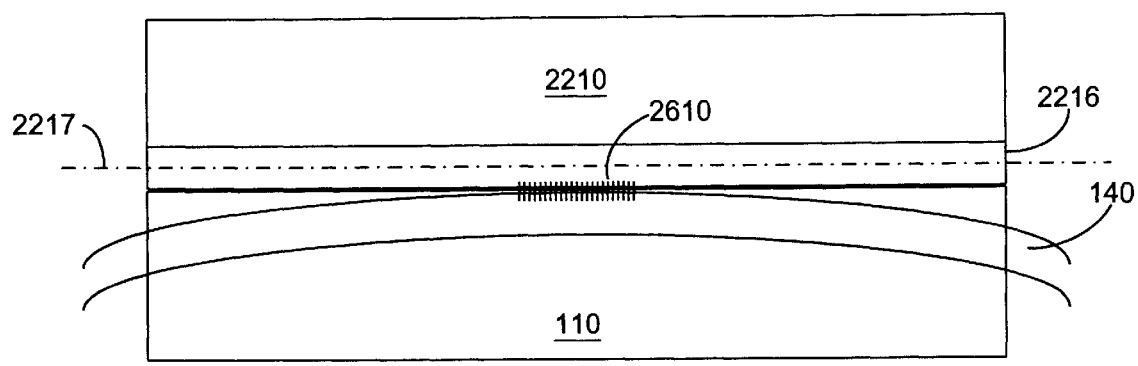

FIGS. 26A, 26B, and 26C show three embodiments of fiber-waveguide couplers where a diffraction grating 2610 is implemented to assist the optical coupling. In FIG. 26A, the grating 2610 is formed in the fiber 140. This may be achieved by fabricating the grating pattern in the fiber core or in the fiber cladding. In FIG. 26B, the grating 2610 is formed in the waveguide 2216. In FIG. 26C, the grating 2610 is formed between the waveguide 2216 and the fiber 140 by, e.g., forming the grating pattern in a thin overlay layer between the waveguide 2216 and the fiber 140. Such a diffraction grating 2610 may be fabricated by, e.g., etching, modifying the refractive index of the waveguide or fiber by UV exposure, or other processes. When the waveguide 2216 or the cladding of the fiber 140 is etched to form a grating pattern, a different dielectric material, such as a liquid crystal material, may be filled and sealed in the grating area to form the final grating 2610. The spatial varying pattern of the grating 2610 is essentially along the optic axis 2217 of the waveguide 2216 or the optic axis of the fiber 140 at the interacting region of the waveguide 2216 and the fiber 140.

The grating 2610 may also be a tunable grating which changes its diffracting characteristics in response to an external control signal. An electro-optic or a thermal optic material may be used to form the grating 2601 so that an external electrical signal may be used to control and tune the grating. This tuning may be used to select a particular wavelength or light with a particular polarization to be coupled while other optical signals remain in either the waveguide 2216 or the fiber 140.

Figure 27:
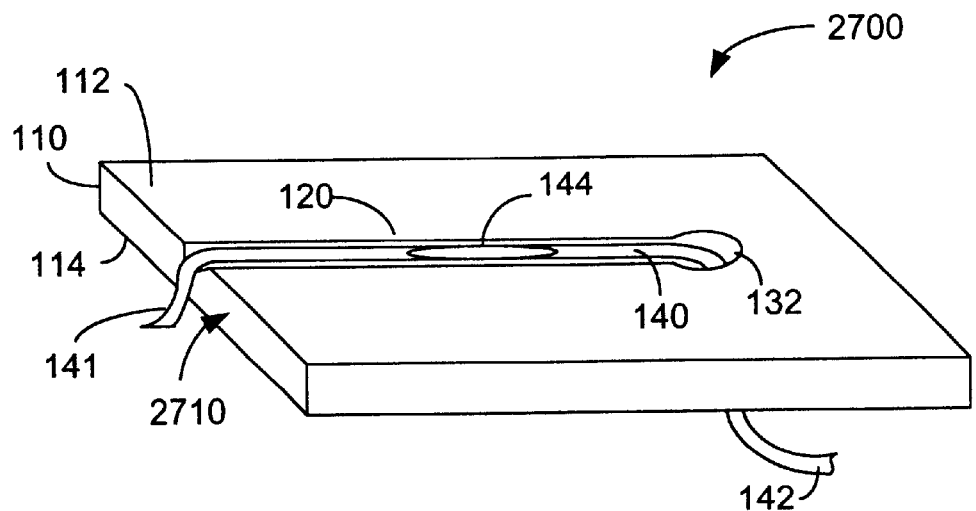
FIG. 27 shows a design to engage a side-polished fiber onto a substrate by using an elongated groove with a single through hole.

FIG. 1 shows the use of elongated groove 120 and two through holes 131 and 132 at the ends of the groove 120 to engage a fiber to the substrate 110 and to form each fiber coupling port 144. Alternatively, only one through hole 132 in the substrate 110 may be needed to engage the fiber 140 to form one of two fiber coupling ports in each fiber module. As shown in the design 2700 in FIG. 27, the groove 120 may extend to one end side 2710 of the substrate 110 so that one end 141 of the fiber 140 leaves the groove 120 without going through a through hole. Both fiber coupling ports of the fiber 140 may be formed in this manner for coupling to the two respective ports of another fiber or a planar waveguide.

Figure 28:
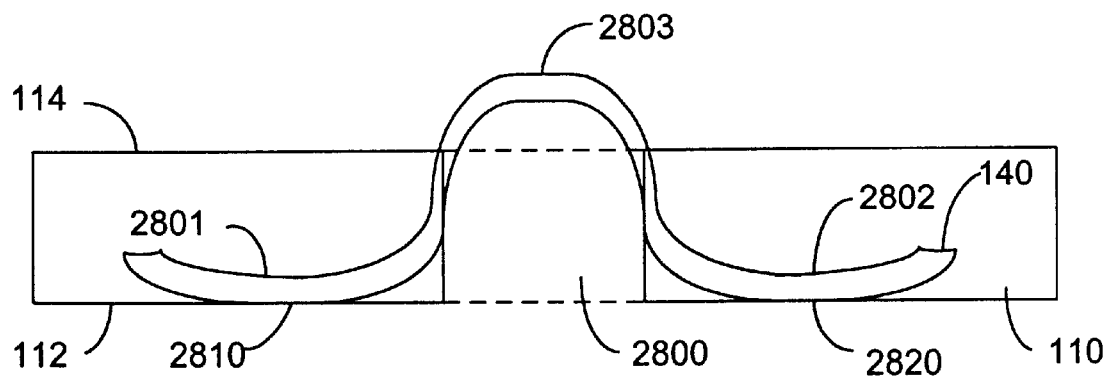
FIG. 28 shows another design to engage a side-polished fiber onto a substrate.

FIG. 28 further shows that, a single through hole 2800 may be formed through the substrate 110 between two fiber coupling ports 2810 and 2820 on the substrate surface 112. Fiber portions 2801 and 2802 of the fiber 140 are located in respective elongated grooves on the surface 112 that are connected to the through hole 2800. The fiber portion 2803 between the portions 2801 and 2802 is located in or above the through hole 2800. The fiber coupling ports 2810 and 2820 are used to interface with two corresponding coupling ports of another fiber or a waveguide to form a Mach-Zehnder device as described above. The fiber portion 2803 may be designed to have an adjustable portion similar to the fiber portion 1530 in FIG. 15.

In the above devices, at least one buffer layer of a suitable material such as a dielectric material like silicon dioxide or silicon nitride may be formed over a groove under the fiber. This buffer layer may be designed to have certain mechanical or thermal properties to stabilize the structure formed by the substrate, the buffer layer, and the fiber by reducing the mechanical or thermal stress between the silicon substrate and the glass fiber. Therefore the reliability of the device can be improved. For example, if the substrate is formed of silicon, a dielectric material with a coefficient of thermal expansion (CTE) between the CTE values of the silicon and the glass fiber may be used as the buffer. Two or more buffer layers may also be used to achieve desired stabilizing effects.

Although a number of embodiments are described, various modifications and enhancements may be made without departing from the following claims.

What is claimed is:

1. A device, comprising:

first and second separate optical paths joined to each other at two separate locations to form an input joint and an output joint, said input joint configured to receive input optical signals from either one of said first and said second optical paths and split a received optical signal into a first optical signal into said first optical path and a second optical signal into said second optical path, said output joint configured to combine said first and said second optical signals to cause optical interference therebetween, wherein at least said first optical path is formed by an optical fiber engaged to a substrate to form two optical fiber coupling ports on one side of said substrate which partially constitute said input and output joints, respectively, wherein said substrate includes first and second opposing substrate surfaces to have an elongated groove formed over said first substrate surface at each location of said input and said output joints, and at least one opening formed at one end of each elongated groove, each opening formed through said substrate to extend between said first and second substrate surfaces, and wherein said optical fiber passes through each opening from said second substrate surface to said first substrate surface to have a first fiber portion disposed in said elongated groove at location of said input joint and a second fiber portion disposed in said elongated groove at location of said output joint, each of said first and said second fiber portions having a portion of fiber cladding removed to form one of said two optical fiber coupling ports to allow for evanescent coupling of energy between said first and said second optical paths.

2. The device as in claim 1, wherein a second opening is formed at the other end of said elongated groove located at one of said input and output joints to penetrate said substrate between said first and said second substrate surfaces, said fiber having another portion that passes through said second opening to be over said second substrate surface.

3. The device as in claim 1, wherein said second optical path includes a second optical fiber engaged to a second substrate.

4. The device as in claim 1, wherein said second optical path includes a planar waveguide formed over a second substrate.

5. The device as in claim 4, wherein said planar waveguide path includes an adjustable section between said input and said output joints, said adjustable section being configured to respond to a control signal to cause a relative phase shift between said first and said second optical paths.

6. The device as in claim 1, wherein at least one optical path includes an adjustable section between said input and said output joints, said adjustable section being configured to respond to a control signal to cause a relative phase shift between said first and said second optical paths.

7. The device as in claim 6, wherein said adjustable section is configured to change at least an index of refraction thereof according to a change in said control signal.

8. The device as in claim 7, wherein said index of refraction of said adjustable section includes an index of a fiber core thereof.

9. The device as in claim 7, wherein said index of refraction of said adjustable section includes an index of a fiber cladding thereof.

10. The device as in claim 6, wherein said adjustable section is configured to change at least one of a physical length and a refractive index of said adjustable section according to a change in said control signal.

11. The device as in claim 6, further comprising a control unit configured to produce said control signal.

12. The device as in claim 1, wherein said optical fiber in said first optical path includes an adjustable section between said input and said output joints, said adjustable section being configured to respond to a control signal to cause a relative phase shift between said first and said second optical paths at said output joint.

13. The device as in claim 1, wherein said optical fiber in said first optical path has a third portion located outside a fiber portion between said first and said second optical fiber coupling ports, said third portion configured to have a coupling portion whose fiber cladding is at least partially removed to form a third fiber coupling port for coupling energy into or output of said optical fiber.

14. The device as in claim 13, wherein said substrate is configured to have a third elongated groove formed on said second substrate surface, at least one opening formed at one end of said third elongated groove through said substrate to extend between said first and second substrate surfaces, and wherein said third portion of said optical fiber includes one portion that passes through said one opening from said first substrate surface to said second substrate surface to place said coupling portion in said third elongated groove.

15. The device as in claim 14, further comprising:
a third substrate having two opposing substrate surfaces to have a fourth elongated groove formed over one of said two opposing substrate surfaces, and
an additional optical fiber having a portion engaged to said fourth elongated groove with fiber cladding partially removed to form a fourth optical fiber coupling port for evanescent coupling,
wherein said third substrate is positioned to place said fourth optical fiber coupling adjacent to said third coupling port to effectuate evanescent coupling between said optical fiber and said additional optical fiber.

16. The device as in claim 1, further comprising at least one buffer layer between said fiber and said substrate to reduce a stress between said fiber and said substrate.

17. A device, comprising:
first and second half couplers respectively formed on first and second substrates and respectively having first and second optical fibers,
wherein a respective substrate in each half coupler comprises (1) first and second opposing substrate surfaces, (2) a first elongated groove formed over said first substrate surface, (3) first and second openings respectively located at two ends of said first elongated groove and formed through said substrate to extend between said first and second substrate surfaces, (4) a second elongated groove formed over said first substrate surface, and (5) third and fourth openings respectively located at two ends of said second elongated groove and formed through said substrate to extend between said first and second substrate surfaces;
wherein a respective optical fiber in each half coupler is engaged to said respective substrate to pass through said first, said second, said third, and said fourth openings to have a first fiber portion in said first elongated groove, a second fiber portion in said second elongated groove, and a third fiber portion between said first and said second fiber portions positioned over said second substrate surface, and wherein fiber claddings of said first and said second fiber portions are removed to form first and second fiber coupling ports for evanescent coupling into or out of said respective optical fiber; and
wherein said first and said second half couplers are positioned to have said first substrate surfaces face each other where said first and said second optical coupling ports of said first optical fiber are respectively coupled to said first and said second optical coupling ports of said second optical fiber to form a Mach-Zehnder interferometer.

18. The device as in claim 17, wherein said third fiber portions in said first and said second optical fibers are configured to produce a fixed difference between optical path lengths of said third fiber portions of said first and said second optical fibers.

19. The device as in claim 18, wherein said fixed difference corresponds to a phase shift of either about $2N\pi$ or about $2(N+1)\pi$, where $N=0$, $\pm 1$, $\pm 2$, etc. for one or more selected wavelengths of optical energy.

20. The device as in claim 17, wherein said third fiber portion in said first optical fiber includes an adjustable section that is configured to respond to a control signal to cause a change in an optical path length of said third fiber portion.

21. The device as in claim 20, wherein said third fiber portion in said second optical fiber also includes an adjustable section that is configured to respond to a control signal to cause a change in an optical path length of said third fiber portion.

22. The device as in claim 20, wherein said adjustable section is configured to change at least a refractive index thereof.

23. The device as in claim 20, wherein said adjustable section is configured to change at least a physical length thereof.

24. The device as in claim 20, wherein said adjustable section is configured to change both a refractive index and a physical length thereof.

25. A device, comprising:
a first module having a first substrate and an optical fiber,
wherein said first substrate comprises (1) first and second opposing substrate surfaces, (2) a first elongated groove formed over said first substrate surface, (3) first opening located at one end of said first elongated groove and formed through said substrate to extend between said first and second substrate surfaces, (4) a second elongated groove formed over said first substrate surface, and (5) a second opening located at one end of said second elongated groove and formed through said substrate to extend between said first and second substrate surfaces,
wherein said optical fiber is engaged to said first substrate to pass through said first and second openings to have a first fiber portion in said first elongated groove, a second fiber portion in said second elongated groove, and a third fiber portion between said first and said second fiber portions that is at least partially positioned over said second substrate surface, and wherein fiber claddings of said first and said second fiber portions are removed to form first and second fiber coupling ports for evanescent coupling into or out of said optical fiber; and a second module positioned adjacent to said first module, said second module having a second substrate and a planar waveguide formed on said second substrate, said planar waveguide having two coupling regions spaced from each other and interfaced with said first and said second fiber coupling ports for evanescent coupling between said optical fiber and said planar waveguide.

26. The device as in claim 25, wherein said third fiber portion in said optical fiber includes an adjustable section that is configured to respond to a control signal to cause a change in an optical path length of said third fiber portion.

27. The device as in claim 26, wherein said adjustable section is configured to change a refractive index thereof.

28. The device as in claim 26, wherein said adjustable section is configured to change a physical length thereof.

29. The device as in claim 26, wherein said adjustable section is configured to change both a refractive index and a physical length thereof.

30. The device as in claim 26, wherein said second module includes a first cladding layer over said substrate, said planar formed over said first cladding layer, and a second cladding layer formed to cover said planar waveguide, wherein portions of said second cladding layer are removed at said two coupling regions to interface with said first and said second fiber coupling ports.

31. The device as in claim 25, wherein said planar waveguide is a ridge waveguide.

32. The device as in claim 25, wherein said planar waveguide is a channel waveguide.

33. The device as in claim 25, wherein said planar waveguide is a slab waveguide.

34. The device as in claim 25, further comprising an optical grating positioned to assist optical coupling between said optical fiber and said planar waveguide.

35. The device as in claim 24, wherein said optical grating is formed in said planar waveguide.

36. The device as in claim 34, wherein said optical grating is formed in said fiber.

37. The device as in claim 34, wherein said optical grating is formed between said fiber and said planar waveguide.

38. The device as in claim 34, wherein said optical grating is tunable in response to a grating control signal.

39. The device as in claim 25, further comprising at least one buffer layer between said fiber and said first substrate to reduce a stress between said fiber and said first substrate.

40. A device, comprising:

first and second separate optical paths joined to each other at two separate locations to form an input joint and an output joint, said input joint configured to receive input optical signals from either one of said first and said second optical paths and split a received optical signal into a first optical signal into said first optical path and a second optical signal into said second optical path, said output joint configured to combine said first and said second optical signals to cause optical interference therebetween, wherein at least said first optical path is formed by an optical fiber engaged to a substrate to form two optical fiber coupling ports on one side of said substrate which partially constitute said input and output joints, respectively, wherein said substrate includes first and second opposing substrate surfaces to have first and second elongated grooves formed over said first substrate surface where said input and said output joints are formed, and a common opening formed through said substrate to extend between said first and second substrate surfaces and connected to one end of said first elongated groove and one end of said second elongated groove, and wherein said optical fiber passes through said opening from said second substrate surface to said first substrate surface to have a first fiber portion disposed in said first elongated groove at location of said input joint, a second fiber portion disposed in said second elongated groove at location of said output joint, and a third fiber portion between said first and said second fiber portions which has portion in said opening, each of said first and said second fiber portions having a portion of fiber cladding removed to form one of said two optical fiber coupling ports to allow for evanescent coupling of energy between said first and said second optical paths.

41. The device as in claim 40, further comprising at least one buffer layer between said fiber and said substrate to reduce a stress between said fiber and said substrate.

42. The device as in claim 40, wherein said third fiber portion includes an adjustable fiber portion which changes at least one of a physical length and a refractive index in response to a control signal.

* * * * *